United States Patent [19]

Juvin et al.

[11] Patent Number: 4,845,765
[45] Date of Patent: Jul. 4, 1989

[54] PROCESS FOR THE AUTOMATIC RECOGNITION OF OBJECTS LIABLE TO OVERLAP

[75] Inventors: Didier Juvin, Paris; Shenbiao Tan, Les Ulis, both of France

[73] Assignee: Commissariat A L'Energie Atomique, Paris, France

[21] Appl. No.: 207,000

[22] Filed: Jun. 8, 1988

Related U.S. Application Data

[63] Continuation-in-part of Ser. No. 38,735, Apr. 15, 1987, abandoned.

[30] Foreign Application Priority Data

Apr. 18, 1986 [FR] France ................................ 86 05594

[51] Int. Cl.$^4$ ............................................. G06K 9/34
[52] U.S. Cl. ........................................ 382/21; 382/22; 382/25; 382/37; 382/8
[58] Field of Search .................... 382/8, 21, 22, 25, 60, 382/15, 37

[56] References Cited

U.S. PATENT DOCUMENTS

| | | | |
|---|---|---|---|
| 3,638,188 | 1/1972 | Pincoffs et al. | 340/146.3 AC |
| 4,545,067 | 10/1985 | Juvin et al. | 382/56 |
| 4,566,124 | 1/1986 | Yamamoto et al. | 382/22 |
| 4,630,225 | 12/1986 | Hisano | 382/8 |

FOREIGN PATENT DOCUMENTS

0115462  1/1984  France .

OTHER PUBLICATIONS

Segen, "Locating Randomly Oriented Objects from Partial View," Proc. of SPIE, vol. 449, Nov. 1983, pp. 676-684.
Perkins, "Multilevel Vision Recognition System," IEEE Proc. of Int'l. Joint Conf. on Pattern Recognition, pp. 739-744.
Bolles et al., "Recognizing & Locating Partially Visible Objects: The Local-Feature-Focus Method", Int'l. J. of Robotics Reserch, vol. 1, No. 3, 1982, pp. 57-82.
Stimets et al., "Rapid Recognition of Object Outlines in Reduced Resolution Images", Pattern Recognition, vol. 19, No. 1, 1986, pp. 21-32.
Tou, "PUMAC-A Picture Understand Machine," 5th International Conference on Pattern Recognition, vol. 1, Dec. 1980, pp. 754-758.
Freeman, "Computer Processing of Line-Drawing Images", Computing Surveys, vol. 6, No. 1, Mar. 1974, pp. 77-85.
Segen, "Locating Randomly Oriented Objects from Partial View," Proc. of SPIE, vol. 449, 1983, pp. 676-684.
Perkins, "Multilevel Vision Recognition System", IEEE Proc. of Int'l. Joint Conf. on Pattern Recognition, pp. 739-744.
Bolles et al., "Recognizing and Locating Partially Visible Objects: The Local-Feature-Focus Method," Int'l. J. of Robotics Reserach, vol. 1, No. 3, pp. 57-82.

Primary Examiner—Leo H. Boudreau
Assistant Examiner—Donald J. Daley
Attorney, Agent, or Firm—Michael N. Meller

[57] ABSTRACT

The invention relates to a process for the recognition of objects liable to overlap, on the basis of reference images of said objects and the image of the group of said objects.

The process consists of coding successive elementary segments, whose ends are substantially located on the contour of each image in the "learning" phase of the contour of each object and in the object recognition phase. Pairs of characteristic segments in the contour of each image are then investigated, each characteristic segment being oriented and defined by its oriented angle, its length and its origin. Each pair giving a good image discrimination is called a transition vector. These vectors are hierarchized for the reference images and compared with the transition vectors of the image of the objects to be recognized. For any object assumed to be recognized, a fine verification takes place on the elementary segments.

Application to the recognition or identification of objects and to artificial vision in robotics.

3 Claims, 2 Drawing Sheets

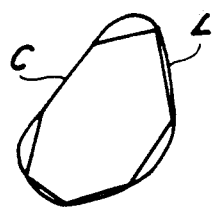
FIG. 1
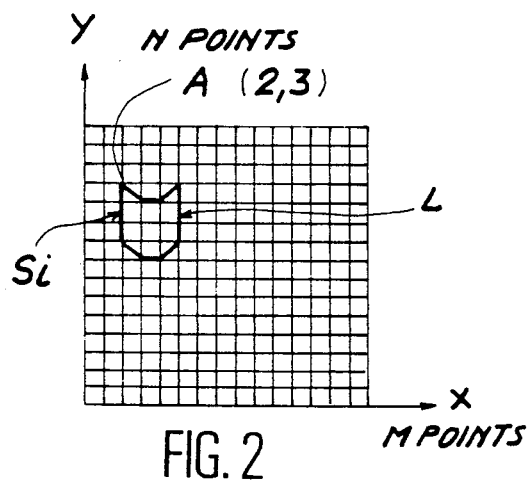
FIG. 2
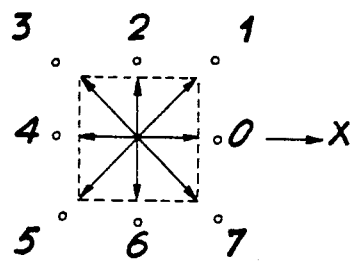
FIG. 3
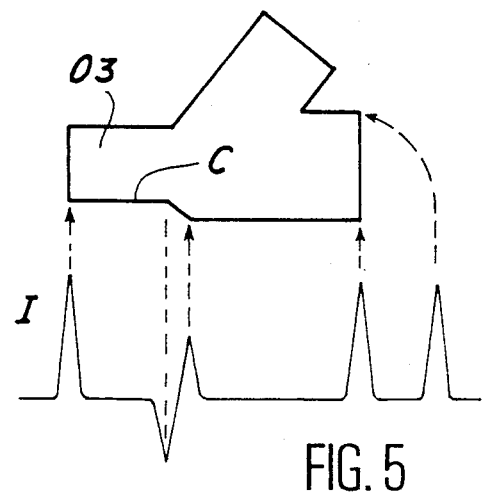
FIG. 5
FIG. 4
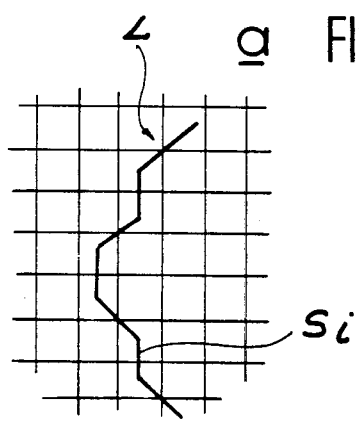
a
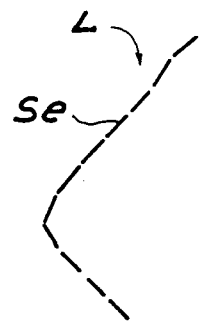
b

PROCESS FOR THE AUTOMATIC RECOGNITION OF OBJECTS LIABLE TO OVERLAP

RELATED APPLICATION

This application is a continuation-in-part of U.S. Pat. application Ser. No. 038,735 filed on Apr. 15, 1987, now abandoned.

BACKGROUND OF THE INVENTION

The present invention relates to a process for the automatic recognition or identification of objects liable to overlap. It applies to vision machines and more particularly to robotics, in which studies are presently directed at so-called "intelligent" robots able to interpret data from the external medium. The recognition or identification of partly hidden objects, e.g. as a result of a partial overlap of said objects, is of considerable importance for the next generation of vision machine.

Different processes for the recognition of objects liable to overlap are known in the art. One of these processes consists of segmenting the contour line of the image of each object to be recognized and defining in the segmentation of each contour "privileged" segments, which are in fact the longest segments. This definition of privileged segments is carried out during a learning period.

In this known process, during the period of recognizing the different objects, hypotheses are issued on the basis of an examination of the privileged segments and associated segments recognized in the contour of the image of the objects to be recognized. A "label" is then allocated to each privileged segment recognized in the contour of the image of the objects to be recognized. Then, on the basis of the different labels obtained in this way, an overall criterion is defined, which is a measure of the consistency and non-ambiguity of the labelling system. A quality score is then calculated for evaluating the hypotheses.

This type of process takes a long time and is very expensive, because it generates a large quantity of hypotheses, which must be checked according to complex criteria for measuring the consistency and non-ambiguity of the labels. This type of process is e.g. described in the doctorate thesis entitled "A bidimensional vision system in industrial robotics" by N. AYACHE, 1983.

The invention aims at obviating the disadvantages of this type of process and more particularly at permitting an automatic, fast recognition of objects liable to overlap, without it being necessary to emit, during this recognition, a large number of hypotheses and criteria for checking said hypotheses. These objectives are more particularly attained by using a particular segmentation of the contours of the images of the reference objects and the images of the object to be recognized and as a result of the choices of the pairs of characteristic segments making it possible to define "transition vectors" on the basis of which the hypotheses and recognition criteria are developed.

SUMMARY OF THE PRESENT INVENTION

The present specifically relates to a process for the automatic recognition of objects liable to overlap, on the basis of respective reference images of said objects, and the image of the group of objects to be recognized, said images being stored in the form of digital values representing for each image the coordinates of the points of a contour line of said image, in a frame of reference, said process consisting of coding, for each image, successive elementary segments, whereof the ends are substantially located on the corresponding contour line, so that for each segment, said coding gives the length of said segment, as well as its angle with respect to a reference direction, said coding operation being performed both during the "learning" phase of the different objects to be subsequently recognized and in a subsequent "recognition" phase of the objects liable to overlap, wherein it comprises in the learning phase: investigating for each reference image contour, pairs of successive or non-successive characteristic segments of said path, each formed from one or more elementary segments, said characteristic segments being oriented in a predetermined direction of the contour path, each pair determining a characteristic transition vector defined by parameters which are the value of the angle, oriented in the direction of the path, between the two oriented characteristic segments of the pair, the coordinates of the origin and the length of each characteristic segment of the pair, a transition vector being characteristic when its parameters bring about a discriminating power of the contour of the corresponding object, even when said object is overlapped by one or more other objects, the parameters of the transition vectors being stored, hierarchizing the transition vectors of a contour as a function of their discriminating power, modifying said hierarchization of the transition vectors during the acquisition of the transition vectors of the contours of the different objects, so as to eliminate the similar transition vectors for the different contours, said process then comprising in the recognition phase: performing the same transition vector determination operation in the characteristic segments of the contour of the image of the objects to be recognized, comparing in the hierarchization order, the values of the parameters of the transition vectors of the contour of the image of the objects to be recognized and the contour of the reference images of each object, so as to investigate the similarities of the values of said parameters, forming a presence hypothesis of an object corresponding to a transition vector for which the comparison has established a similarity, and effecting a fine check of said hypothesis by comparing successive elementary segments of the contour of the reference image of said object with successive elementary segments of the contour of the image of the objects to be recognized.

According to another feature, the coded successive elementary segments are obtained by a Freeman coding making it possible to obtain successive segments defined by their orientation and whose ends are substantially located on the contour line of each image, said Freeman coding being followed by a corrective processing making it possible to deduce from each segment coded according to Freeman, one or more sucessive elementary segments, whose ends are located on the contour line of the image, said successive elementary segments having equal lengths and permitting isotropic coding.

According to another feature, the corrective processing, for each Freeman-coded segment, comprises differentiating said segment with respect to its order number in the contour in order to compensate orientation irregularities, performing a conversion of the values resulting from the differentiation of each segment in order to compensate length irregularities, filtering the resultant signal of said conversion, sampling said signal at constant frequency and then integrating the sampled signal, said integration producing the successive coded elementary segments. The corrective processing also makes it possible to extract angular points, i.e. facilitates the extraction of the characteristic segments.

Moreover, said conversion can either be a digital-analog conversion permitting a sampling on the analog signal, or a digital-digital conversion.

BRIEF DESCRIPTION OF THE DRAWINGS

The invention is described in greater detail hereinafter relative to non-limitative embodiments and the attached drawings, wherein:

FIG. 1 shows diagrammatically the characteristic segments of a contour line L.

FIG. 2 shows diagrammatically the segmentation of a contour line according to a Freeman code.

FIG. 3 shows the Freeman vectors used for coding a contour line

FIG. 4a shows diagrammatically a contour line segmented according to a Freeman code and FIG. 4b shows diagrammatically the same contour line segmented following a processing performed on Freeman segments.

FIG. 5 shows diagrammatically the derivation stage intervening in the inventive process.

DETAILED DESCRIPTION OF THE PREFERRED EMBODIMENTS

Figure 6:
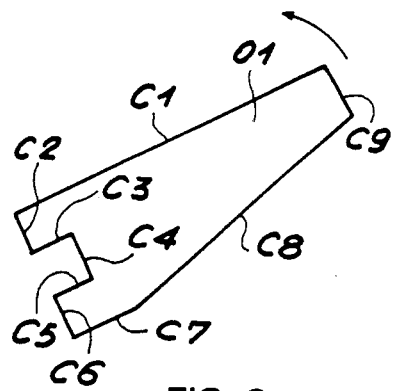
FIG. 6 shows characteristic segments according to the invention of the contour line of an object.

The process for the automatic recognition or identification of objects liable to overlap according to the invention firstly uses a particular coding of the contours of the respective reference images of said objects taken individually, during a learning phase of each object. This particular coding is also used for the image of the group of objects to be recognized during a recognition period, the objects being liable to overlap in such a way that one or more objects are partly hidden by surrounding objects.

The reference images, as well as the overall image of the objects to be recognized are stored in the form of digital values representing, for each of said images, the coordinates of the points of a contour line of said image in a frame of reference. These images are e.g. supplied by optoelectronic means, such as a television camera. In known manner, this camera is connected to an analog-digital converter, which is in turn connected to a processing unit. The function of the latter is, during the recognition period, to determine the digital values corresponding to the coordinates of the points of the characteristic contour line of the reference image of each object. These processing means also make it possible to supply digital values corresponding to coordinates of points of a characteristic contour line of the image of the group of objects to be recognized, during a recognition period, when said objects are liable to overlap. All the digital values are obviously recorded in a memory of the aforementioned processing unit.

The following operation consists of defining characteristic coded segments, whose ends are substantially located on each contour line of the reference images during the learning period and on the contour line of the image of the objects to be recognized during the recognition period. Characteristic segment C of said type, whose ends are located on the contour line L of an image, is shown in FIG. 1. As will be shown hereinafter, each characteristic segment generally has a plurality of successive aligned elementary segments. The coding of each characteristic segment supplies the length of each segment, as well as its angle with respect to a reference direction. This coding is obviously performed both in a learning phase of the different objects to be subsequently recognized and in a subsequent recognition phase of the objects liable to overlap.

Preferably, according to the inventive process, the coding of the characteristic segments firstly consists of coding the segments, making it possible to approximate the contour line of each image in accordance with a method called "coding by Freeman vectors". This coding is followed by a corrective processing making it possible to obtain the aforementioned successive elementary segments, making it possible to define the characteristic segments of the contour line L of the considered image.

The method of coding by Freeman vectors will be made clearer on the basis of FIGS. 2 and 3.

It will firstly be considered that the contour L of the image in question (reference image of an object or image of the group of objects to be recognized) is spatially digitized in a matrix having M×N points in a frame of reference or X-Y coordinate grid. The Freeman coding method consists of coding elementary displacements performed along contour line L in accordance with segments as shown in FIG. 2. In the chosen matrix representation, on considering that each image element is square, there only eight orientation possibilities according to Freeman for passing from one point to another of a contour. These eight possibilities are represented by the eight vectors, called Freeman vectors, numbered 0 to 7 in FIG. 3. These eight vectors are in fact displaced by $\overline{4}$ in the considered matrix representation example. Thus, the Freeman vectors make it possible to define successive coded oriented segments, whose ends are located on each contour line. The coordinates of these ends are obviously known from the coordinates of the points of each contour line.

In the example of the segmented contour L of FIG. 2, if the starting point of the path of said contour is A, of coordinates 2, 3 in the chosen matrix, the Freeman chain associated with contour L can be expressed as a function of the vector numbers of FIG. 3 in the following way:

7,0,1,6,6,6,5,4,3,2,2,2.

This coding is particularly interesting because it reveals the orientation of the segments of the contour line with respect to the reference direction X.

The coding of a contour line of an image by Freeman vectors leads to imprecisions in the approximate representation of the contour by coded segments. Thus, the Freeman vectors are inscribed in a square, as shown in FIG. 3, or in a rectangle. Thus, the Freeman vectors perpendicular to the sides of the square or rectangle, as well as the vectors located in the diagonals of said square or rectangle do not all have the same length.

This Freeman coding is e.g. described in French patent application No. 8304447, filed on Jan. 31, 1983 in the name of the present Applicant.

It is known that Freeman coding breaks down a contour line into a succession of elementary vectors, whose direction is coded on three bits. This coding is very interesting by its conciseness, but also has disadvantages:

a significant digitization noise, because the orientation on 360° is coded on three bits, the real lengths represented by the codes are irregular, as stated hereinbefore, the orientation represented by the codes are not isotropic in the case where the picture elements are rectangular.

These shortcomings are inadmissible for the recognition of overlapping objects, because they lead to an error in the coded representation of the contours and induce privileged directions. This anistropy becomes all the more disturbing in the recognition phase where some of the informations are already deteriorated by the overlapping of objects. However, Freeman coding has an essential interest. It makes it possible to obtain a precise and non-varying contour representation, both in translation and in rotation. This notion of non-varying in translation and rotation is well known in the art and is in particular described in the aforementioned application.

According to the invention, to obviate the imprecisions of Freeman coding, a corrective processing takes place making it possible to deduce, on the basis of each segment coded according to Freeman, one or more successive elementary segments, whose ends are substantially located on the contour line of the image, said elementary segments then being isotropic and of equal lengths.

The corrective processing of the Freeman-coded contour is preferably performed according to the invention in the following way. There is firstly a differentiation of each coded segment with respect to its order number. The principle of said differentiation is as follows: $F(n)$ is the Freeman code which is an integer between 0 and 7, n is the order of the contour segment associated with said code, i.e. $\phi d(F(i), F(j))$ a differentiation function corresponding to the real orientation variation between two codes $F(i)$ and $F(j)$ and C a constant permitting the amplitude normalization, whereby said processing can be represented by: $Fd(n)=C\phi d(F(n+1), F(n))$, in which $Fd(n)$ are codes generated by said processing. This is followed by a conversion of these data corresponding to an abscissa normalization of the coded segments. This abscissa normalization is performed in the following way. If a Freeman code $F(n)$ represents a real length $P(F(n))$, said stage transforms $Fd(n)$ into a pseudo-continuous form $Fd(p)$, the integer n and the real number p obeying the following relation:

$$\sum_{i=0}^{n-1} P(F(j)) \leq P \leq \sum_{i=0}^{n} P(F(j))$$

This is followed by digital filtering on the signals resulting from the above conversion. This filtering is performed in the following way. To reduce digitization noise, use is made of a low-pass filter, whose pulse response is $M(p)$. Filtering is simulated by a time convolution: $G(p)=Fd(p)\phi M(p)$, in which $G(p)$ is the filtered signal. Finally, the filtered signal is sampled. Sampling at regular interval Po on $G(p)$ converts it into $G(kPo)$, which can be designated $G(k)$. The interval Po is determined as a function of the cut-off frequency Fc of the low-pass filter in order to satisfy the Nyquist criterion, but is limited by the resolution of the image on the one hand and by the requisite processing speed on the other. The code $G(k)$ represents a mean orientation variation of the contour on a vicinity, whose size is mainly dependent on the cut-off frequency of the low-pass filter. The sign of $G(k)$ indicates the convexity or concavity of the contour. These characteristics are very interesting, because they prepare and improve segmentation. Segmentation is followed by an integration of the sampled signal, said integration making it possible to obtain the successive elementary segments from which, according to the inventive process, will be determined in the learning and recognition phases, the transition vectors to be defined hereinafter.

FIG. 4 shows an example of a contour portion L of an image obtained by Freeman coding. This portion is formed from successive segments $S_i$ making it possible to relatively imprecisely approximate the contour line. FIG. 4b shows the same contour portion L following the aforementioned processing and before sampling and integration. It can be seen that this contour portion is defined by a larger number of segments $S_e$, called successive elementary segments. The aforementioned processing, as will be shown hereinafter, makes it possible to determine the so-called characteristic segments grouping several elementary segments. Thus, the coding and processing described hereinbefore make it possible to approximate the contour line by the largest possible number of segments of greater length, grouping in each case several elementary segments. These long segments are the aforementioned characteristic segments. This coding and processing also make it possible to obtain an important parameter, which is the orientation of each characteristic segment with respect to a reference direction.

The aforementioned operation of differentiating the successive elementary segments in fact supplies a succession of pulses. The amplitude of each pulse is much greater when the angle between two corresponding successive elementary segments is high. The filtering operation only retains the important means orientation variations, as is shown by fig. 5, which represents the signals obtained after derivation and filtering. Sampling and integration following said filtering make it possible to reconstitute a characteristic image of object $O_3$, constituted by characteristic segments C, each of which is equivalent to an association of several elementary segments. These characteristic segments make it possible, as will be shown hereinafter, to define transition vectors.

FIG. 6 diagrammatically shows the image of the contour of an object obtained following the aforementioned coding and processing. The real contour of said object is not shown in the drawing. All that is shown is its approximate contour following said coding and said processing. The contour thus obtained is formed from characteristic segments C1, C2, C3, . . . C8. Each of these characteristic segments is equivalent to several successive elementary segments, like segments $S_e$ in FIG. 4(b), which are themselves obtained from successive Freeman segments $S_i$ of FIG. 4a. It is assumed that the contour represented in exemplified manner in this drawing is that obtained after coding and processing of a reference image of an object $O_1$ during the learning phase.

The process of the invention consists of choosing a predetermined contour path direction, such as that indicated by the arrow in the drawing. The process then consists of choosing characteristic pairs of successive or non-successive characteristic segments of said contour. These characteristic segments are oriented in the predetermined contour path direction. A pair of characteristic segments can e.g. be the pair of segments C1, C8, but could also be the pair of segments C8, C9. Each pair of characteristic segments makes it possible to determine a characteristic transition vector, as will be shown hereinafter.

Figure 7:
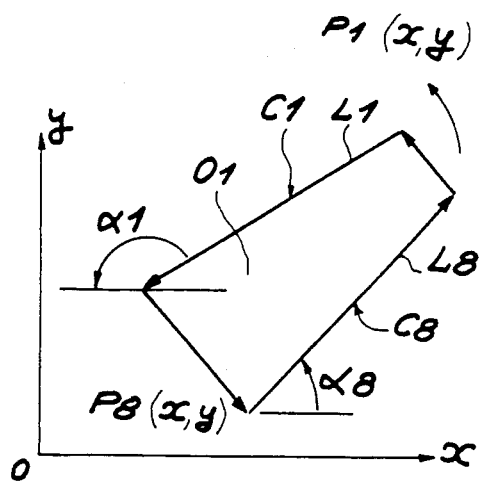
FIG. 7 provides a better understanding of the transition vector notion between two characteristic vectors.

FIG. 7 provides a better understanding of the notion of the transition vector, by referring e.g. to the pair of characteristic segments C1, C8 of object $O_1$. The pairs of characteristic segments of a given object are those which, during the recognition phase of the different objects and even in the case of a subsequent overlapping thereof, will permit a better discrimination of the predetermined object, such as that whose coded contour is shown in FIG. 6.

A transition vector is defined as a relation between two characteristic segments of a contour. In the example represented in the drawing, segment C8 can be called e.g. the inlet segment in the zone of the contour of the image of object $O_1$, whereas segment C1 can be called the outlet segment of said zone. The portions of the contour not belonging to the pairs of characteristic segments chosen are considered as a non-interesting part of the zone of the contour because, according to the process, no interest is attached to the path of the contour within said zone.

A transition vector for the pair of characteristic segments C1, C8 is defined by the three following parameters: the inlet orientation $\alpha_8$, which is the angle oriented in the predetermined travel direction between the reference axis Ox of a reference coordinate (O, x, y) and the characteristic inlet segment C8 oriented in the direction of travel, the outlet orientation, which is the oriented angle $\alpha_1$ between the reference axis Ox and the characteristic outlet segment C1, oriented in the direction of travel, the "valid" space, which can be defined by the coordinates of the starting point $P_8(x,y)$ and $P_1(x,y)$ and by the length $L_8$, $L_1$ of the oriented segments C8 and C1.

According to the invention, a transition vector is characteristic, when its parameters (inlet orientation, outlet orientation, origin of the characteristic segments of the pair and length of these segments) leads to a discriminating power of the contour of the considered object, even if in the subsequent recognition phase, said object is overlapped by one or more other objects.

Figure 8:
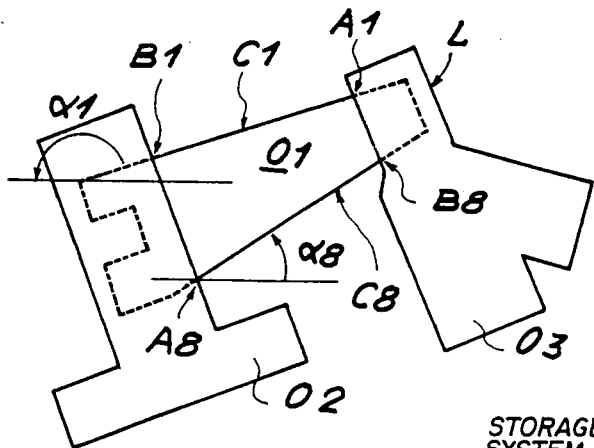
FIG. 8 shows diagrammatically certain characteristic segments in the contour of the image of several overlapping objects.

In particular, the difference $\alpha_d = \alpha_1 - \alpha_8$ remains valid, even in the case of a partial overlap of the considered object by other objects, as is shown by FIG. 8. The latter shows that in the case of a partial overlap of the considered object $O_1$ by two other objects $O_2$ and $O_3$, the valid space is reduced, because the characteristic vectors C8 and C1 have truncated lengths, but the difference $\alpha_d = \alpha_1 - \alpha_8$ remains valid. The importance of the transition vectors is clear because, during the recognition phase, the transition vector constituted by the pair C8, C1 of characteristic vectors makes it possible to recognize the object $O_1$, even if certain parts of the latter are hidden by other surrounding objects.

Thus, the essential information relating to a transition vector is based on the orientation difference $\alpha_d$ between the characteristic vectors of the pair relating to said transition vector. Bearing in mind this criterion, it is possible to arrange the parameters of the transition vectors in a hierarchic manner, as a function of the probability of the same orientation $\alpha_d$ appearing for a considered object and for other surrounding objects liable to overlap the considered object. The more the orientation $\alpha_d$ is particular or special for an object, the greater the importance attached to the corresponding transition vector in the dictionary of transition vector parameters formed during the learning phase of the different objects.

Thus, the hierarchization of the transition vectors is an important phase of the inventive process. These transition vectors are classified as a function of their discriminating power for the same object and are also classified according to their discriminating power for one object compared with another. The transition vectors are considered to be the most significant identification means of an object. These vectors are hierarchically arranged according to the aforementioned criteria: information quantity, the probability of disappearance and false generation in the case of overlap.

According to the inventive process, processing also takes place of the interaction between the transition vectors of a new object whose contour must be "learned" and the transition vectors of objects whose contours have already been "learned". For a new object, the manner of recording and classifying the transition vectors is dependent on that of existing objects. The transition vectors of existing objects must be rearranged in accordance with those of the new object. The case may arise that a transition vector initially considered as relevant loses much of its significance during learning. In this case, the first group of informations of the dictionary formed during the learning phase makes it possible to calculate a new transition vector to replace an already recorded transition vector which is less relevant.

The operations described hereinbefore for the learning phase are also performed during the phase of recognizing the contour of the different overlapping objects. The same operation of determining the transition vectors in the characteristic segments of the contour of the image of the objects to be recognized is performed.

During the recognition phase, a comparison is carried out, in the hierarchization order, between the values of the parameters of the transition vectors of the image contour of the objects to be recognized and the values of the parameters of the transition vectors of the reference image contour of each object, so as to investigate the similarities of values of said parameters. This comparison is a preliminary analysis, which will be followed by a fine check, as will be shown hereinafter.

The object of the preliminary analysis is to as rapidly as possible generate hypotheses concerning the presence of objects and the orientations thereof. These hypotheses are obviously issued on the basis of the recognition in the image contour of the object to be recognized of transition vectors of certain objects.

The inventive process firstly investigates a similarity between the first transition vectors of each object of the dictionary and a transition vector of the contour of the image of the object to be recognized. If no coincidence is found, the process consists of investigating coincidence with the second transition vectors of each object of the dictionary and so on.

When coincidence is found between transition vectors of the contour of an image of a reference object and transition vectors of the contour of the image of objects to be recognized, a fine verification takes place of the presence hypothesis of the partly recognized object. This fine check consists of comparing successive elementary segments of the contour of the reference image of the partly recognized object on the basis of transition vectors with the successive elementary segments of the image contour of the objects to be recognized.

Fine checking in fact consists of investigating whether there is a superimposing of the contour (defined by elementary segments) of the reference object image, as a function of its orientation indicated by the transition vector found, with part of the contour of the image of said object found in the contour of the image of objects to be recognized.

Three conditions are necessary for concluding that an object is present. It is firstly necessary to check that the segment of the object assumed as recognized is not located outside the contour of the image of the objects to be recognized. The second condition is that the ratio of the identified perimeter of the object in the contour of the image of the object to be recognized to the perimeter of said object (in the reference contour) exceeds a predetermined threshold. This check is possible because the lengths of all the elementary segments of the contour of the image of the reference object are known and one also knows the lengths of the elementary segments of said partly recognized object in the image of the contour of the objects to be recognized. It is also checked that the ratio of the sum of the absolute values of the angles corresponding to the identified angular points in the contour of the image of the objects to be recognized to the total sum of the absolute values of the angles corresponding to the angular points contained in the contour of the reference image of said object exceeds another predetermined threshold.

When these three conditions are combined, the inventive process makes it possible to affirm that the considered object is recognized among all the other objects which possibly partly overlap it.

In the case of perimeters, if the threshold ratio of the perimeter of the object being recognized to the perimeter of the reference object is selected to be unity, recognition of an object will be very difficult. This is because the condition where the ratio of the perimeters is unity corresponds to the case where the object being recognized is not covered to any extent by overlapping objects. At the other extreme, if the threshold of the perimeter ratio is selected to be zero, there is no recognition of an object to be recognized because this corresponds to the case where the object to be recognized is completely hidden by overlapping objects.

Consequently, the threshold value for the perimeter ratio need only be some value between zero and unity, but not equal to zero or unity. In practice, a good threshold value is 0.5, but other values are also satisfactory. The threshold value selected will depend on the objects being recognized in a particular work situation. Therefore a specific threshold value has not been given since the same threshold value would not be used in all situations. Similar considerations apply for the threshold value of the sum of the angles.

Following this stage, if there are transition vectors or segments of the contour to be analyzed, which do not form part of the contour of the already recognized object, the same operations are performed for another object with respect to which it is considered that one or more transition vectors have been recognized.

For example, in FIG. 8, during the recognition phase, a comparison takes place for the contour L of the image of the objects to be recognized, between the transition vector corresponding to the pair of segments A8, B8 and A1, B1 with the transition vector corresponding to the pair of segments C8, C1 of object $O_1$ (partly hidden by overlapping during recognition). It is obvious that in the example shown in the drawing, there is a similarity of the transition vectors.

The following stage consists of performing a finer comparison between successiv elementary segments $S_e$ (cf. FIG. 4b) constituting segments A8, B8 and C8 and segments A1, B1 and C1.

The process described hereinbefore makes it possible to recognize isolated objects, partly hidden by overlapping, by reference to a dictionary of shapes, formed during the learning phase. The recognition time varies as a function of the nature of the scene to be analyzed. If use is made of a standard 16 bit microprocessor, an isolated object is recognized in less than one second, whereas a scene formed from several overlapping objects is analyzed in 2 to 5 seconds. This process offers a very satisfactory reliability, because contour processing utilizing transition vectors essentially takes account of disparities between the objects.

When an object has been recognized, an attempt is made to recognize the other objects present in the scene. For this purpose, masking takes place of all the informations relating to the segments of said object recognized in the scene.

Figure 9:
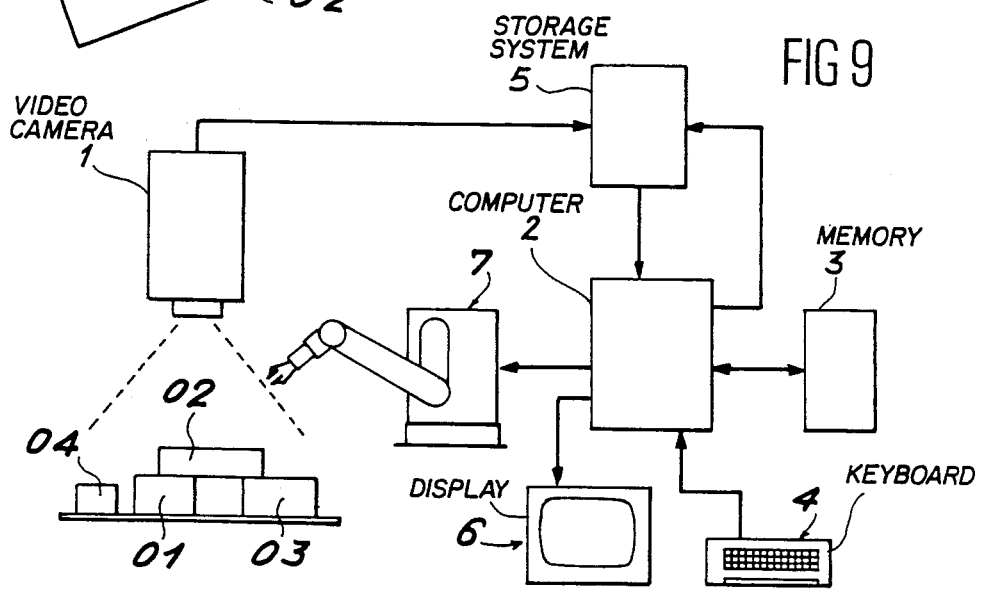
FIG. 9 shows diagrammatically a system making it possible to perform the inventive process.

FIG. 9 diagrammatically shows a system making it possible to perform the inventive process. This system e.g. comprises a video camera 1, which transmits to a processing system and during the learning phase video signals relating to the contours of the reference images of the different objects. This camera transmits during the recognition phase of the video signals relative to the contour of the image of the objects $O_1$, $O_2$, $O_3$, $O_4$ to be recognized.

The processing means comprise a computer 2 connected to a memory 3, in which are recorded a processing program, as well as the digital values to be processed or the processed digital values corresponding to the contours of the reference images or to the contour of the image of the objects to be recognized. Computer 2 can be equipped with a control keyboard 4. This computer controls a digitizing and storage system 5 for the signals received from the camera. Computer 2 receives the output signals from said system 5 and performs all the processing operations described hereinbefore. A display means 6 makes it possible to display the contour of the reference image of each object during the learning phase, or the contour of the image of the objects to be recognized during the recognition phase. Computer 2 can control by an output a robot 7, which seizes a recognized object, if this is necessary.

In a variant of the invention, system 5 also performs part of the processing of the signals received from the camera. This processing operation comprises the operations of extracting from the contour, coding by Freeman vectors, differentiation, digital-analog conversion, filtering, sampling and integration referred to hereinbefore. The computer receives the output signals from the processing system 5 and investigates the characteristic segments on the basis of successive elementary segments determined by the processing system 5 and calculates the transition vectors. The computer program for carrying out the process of the invention for carrying out the process of the invention is attached as Appendix I.

APPENDIX I

PL/M-86 COMPILER    RECONNAISSANCE

SERIES-III PL/M-86 V2.7 COMPILATION OF MODULE RECONNAISSANCE
OBJECT MODULE PLACED IN :F2:VXIDEN.OBJ
COMPILER INVOKED BY:  PLM86.86 :F2:VXIDEN.SRC DEBUG

```
                    /************************************************************
                    *            Reconnaissance              VX200              *
                    *            V.-01- 26.09.1986                              *
                    ************************************************************/
                    $LARGE
    1               RECONNAISSANCE: DO;
                    $NOLIST INCLUDE(:F2:PLMLIB.SRC)
                    $NOLIST INCLUDE(:F2:SOFPUB.LIT)
                    $NOLIST INCLUDE(:F2:VXSEGM.EXT)
                    $NOLIST INCLUDE(:F2:VXUTIL.EXT)
                    $NOLIST INCLUDE(:F2:VXDICO.EXT)

136     1         DCL veri_step LIT '5';
  137     1         DCL vtf.elast LIT '4';
  138     1         DCL aju_elast LIT '5';
  139     1         DCL aju_corri LIT '8';
  140     1         DCL epais_eros LIT '1';
  141     1         DCL lim_xysom LIT '6';

142     1         DCL PRESOBJ(rcnobj) STRUC (
                            (NUM,
                             ORI,
                             DROC) BYTE, (RPERI,
                             RSUP, X,Y,
                             XP1,YP1,
                             XP2,YP2)
                            WORD) PUBLIC;
  143     1         DCL OBJTROUVE BYTE PUBLIC;

144     1         DCL SUPERIM_SEUIL(rcnobj) WORD;
  145     1         DCL CMUV(rcnobj) STRUC (CMUH(rcnobj) WORD);
  146     1         DCL (SSGEXM,VTEXM,VTSGEXM) BYTE PUBLIC;
  147     1         DCL (PTI,ANGZX,EPAIX,ANGZY,EPAIY,XYSOM) BYTE PUBLIC;
  148     1         DCL (REC_ECART,DEPASS,NEGLIGE_PERIM,VTF_TOLER,AJU_TOLER,GRU_VERI_TOLER,
                         FIN_VERI_TOLER,MIN_VALUEPT,MIN_SG_ID,SML_ORIECAR,GRT_ORIECAR,SUPERIM,
                         GRT_AJUECAR,SML_AJUECAR,NEGL_SGLGR,SEG_BOUT,REC_GRD_SEUIL) WORD PUBLIC;

149     1         DCL SUPLGR(rcnobj) WORD;
  150     1         DCL (VTRTH,VALANG)(vtseg) BYTE;
  151     1         DCL (SSGORD,SSGANA,SSGAN7,DEFORI,VTORD,VTANA,OBJETORD,OBJANA,IDA,ISG,PTET,
                         VTIDX,ZROFERM,ROTAT) BYTE;
  152     1         DCL (FLAG,FLAG1,FLGSSG,OB,OC,FLAGP)(sesreleve) BYTE;
  153     1         DCL (OCX,OCY)(sesreleve) DWORD;
  154     1         DCL (ABSC,COOR,PARTSG,PARTINP)(sesreleve) WORD;
  155     1         DCL (PERIID,XLOC,YLOC,XPOS,YPOS,XCORR,YCORR) WORD;
```

PL/M-86 COMPILER    RECONNAISSANCE

```
  156     1         DCL COSX(65) BYTE PUBLIC;

157     1         DCL COSY(65) BYTE DATA(128,128,128,128,127,127,127,126,126,125,124,123,
                         122,122,121,119,118,117,116,114,113,111,110,108,106,105,103,101,99,97,95,
                         93,91,88,86,84,81,79,76,74,71,68,66,63,60,58,55,52,49,46,43,40,37,34,31,
                         25,22,19,16,13,9,6,3,0);
```

```
158  1        ABSB: PROC(A) BYTE PUBLIC;
159  2          DCL A BYTE;
160  2          IF A<80H THEN RETURN A;
162  2          ELSE RETURN -A;
163  2        END ABSB;

164  1        DIFB: PROC(A,B) BYTE;
165  2          DCL (A,B) BYTE;
166  2          IF A>B THEN RETURN A-B;
168  2          ELSE RETURN B-A;
169  2        END DIFB;

170  1        DIFW: PROC(A,B) WORD;
171  2          DCL (A,B) WORD;
172  2          IF A>B THEN RETURN A-B;
174  2          ELSE RETURN B-A;
175  2        END DIFW;

176  1        PTSETAT: PROC(X,Y) BYTE PUBLIC;
177  2          DCL (NH,NB,NG,ND,INCR,DISMX) BYTE;
178  2          DCL (X,Y,MX,MN,XT,YT,XC,YC,X0,X1,Y0,Y1,S,TMP) WORD;
179  2          DCL (WD1,WD2,WD3) DWORD;
180  2          IF X>BXD THEN IF X>BXD+ANGZX OR X>resolution THEN DO;
183  3            IF X<resolution THEN RETURN ZROFERM;
185  3            IF X<8000H THEN RETURN D_HORS AND 1;
187  3            RETURN G_HORS AND 1;
188  3          END;
189  2          IF Y>BYB THEN IF Y>BYB+ANGZY OR Y>resolution THEN DO;
192  3            IF Y<resolution THEN RETURN ZROFERM;
194  3            IF Y<8000H THEN RETURN B_HORS AND 1;
196  3            RETURN H_HORS AND 1;
197  3          END;
198  2          IF X<BXG THEN IF X+ANGZX<BXG THEN RETURN ZROFERM;
201  2          IF Y<BYH THEN IF Y+ANGZY<BYH THEN RETURN ZROFERM;
204  2          PTI=0FFH;
205  2          DISMX=XYSOM;
206  2          DO ISG=PDSG TO PFSG;
207  3            XT=DIFW(X,PICX(ISG));
208  3            YT=DIFW(Y,PICY(ISG));
209  3            IF XT<=ANGZX AND YT<=ANGZY THEN DO;
211  4              IF (TMP:=XT+YT)<lim_xysom THEN DO;
213  5                PTI=ISG;
214  5                RETURN 3;
215  5              END;
216  4              IF TMP<DISMX THEN DO;
218  5                DISMX=TMP;
219  5                PTI=ISG;
220  5              END;
221  4            END;
```

PL/M-86 COMPILER    RECONNAISSANCE

```
222  3            END;
223  2          IF PTI<0FFH THEN RETURN 3;
225  2          NH,NB,NG,ND=0;
226  2          DO PTI=PDSG TO PFSG;
227  3            X0=PICX(PTI-1);
228  3            Y0=PICY(PTI-1);
229  3            X1=PICX(PTI);
230  3            Y1=PICY(PTI);
231  3            IF X=X1 THEN GOTO XMRQ;
233  3            IF X=X0 THEN DO;
235  4              IF PICX(PTI-1)=X0 THEN S=PICX(PTI-2);
237  4              IF X>S XOR X>X1 THEN
238  4                IF Y0<Y THEN NH=NH+1;
240  4                ELSE NB=NB+1;
241  4            END;
242  3            ELSE IF X<X0 XOR X<X1 THEN DO;
244  4              IF (INCR:=(Y0<Y1)) THEN DO;
246  5                MX=Y1;
247  5                MN=Y0;
248  5              END;
249  4              ELSE DO;
250  5                MX=Y0;
251  5                MN=Y1;
252  5              END;
253  4              IF DIFW(Y,MX)<=EPAIY AND DIFW(Y,MN)<=EPAIY THEN RETURN 2;
255  4              IF MX+EPAIY<=Y THEN NH=NH+1;
257  4              ELSE IF MN>=Y+EPAIY THEN NB=NB+1;
259  4              ELSE DO;
```

```
260  5                    WD1=DIFW(MX,MN);
261  5                    WD2=DIFW(X0,X1);
262  5                    XT=DIFW(X0,X);
263  5                    IF XT>=SHR(WD2,1) THEN DO;
265  6                        YT=(WD1*XT+SHR(WD2,1))/WD2;
266  6                        IF INCR THEN YC=MN+YT;
268  6                        ELSE YC=MX-YT;
269  6                    END;
270  5                    ELSE DO;
271  6                        YT=(WD1*(WD2-XT)+SHR(WD2,1))/WD2;
272  6                        IF INCR THEN YC=MX-YT; ELSE YC=MN+YT;
275  6                    END;
276  5                    IF DIFW(Y,YC)<=EPAIY THEN RETURN 2;
278  5                    IF YC<Y THEN NH=NH+1;
280  5                    ELSE NB=NB+1;
281  5                END;
282  4            END;
283  3            XMRQ:
284  3            IF Y=Y1 THEN GOTO YMRQ;
285  3            IF Y=Y0 THEN DO;
287  4                IF PICY(PTI-1)=Y0 THEN S=PICY(PTI-2);
289  4                IF Y>S XOR Y>Y1 THEN
290  4                    IF X0<X THEN NG=NG+1;
292  4                    ELSE ND=ND+1;
293  4            END;
294  3            ELSE IF Y<Y0 XOR Y<Y1 THEN DO;
296  4                IF (INCR:=(X0<X1)) THEN DO;
298  5                    MX=X1;
299  5                    MN=X0;
```

PL/M-86 COMPILER      RECONNAISSANCE

```
300  5                END;
301  4                ELSE DO;
302  5                    MX=X0;
303  5                    MN=X1;
304  5                END;
305  4                IF DIFW(X,MX)<=EPAIX AND DIFW(X,MN)<=EPAIX THEN RETURN 2;
307  4                IF MX+EPAIX<=X THEN NG=NG+1;
309  4                ELSE IF MN>=X+EPAIX THEN ND=ND+1;
311  4                ELSE DO;
312  5                    WD1=DIFW(MX,MN);
313  5                    WD2=DIFW(Y0,Y1);
314  5                    YT=DIFW(Y0,Y);
315  5                    IF YT>=SHR(WD2,1) THEN DO;
317  6                        XT=(WD1*YT+SHR(WD2,1))/WD2;
318  6                        IF INCR THEN XC=MN+XT; ELSE XC=MX-XT;
321  6                    END;
322  5                    ELSE DO;
323  6                        XT=(WD1*(WD2-YT)+SHR(WD2,1))/WD2;
324  6                        IF INCR THEN XC=MX-XT; ELSE XC=MN+XT;
327  6                    END;
328  5                    IF DIFW(X,XC)<=EPAIX THEN RETURN 2;
330  5                    IF XC<X THEN NG=NG+1;
332  5                    ELSE ND=ND+1;
333  5                END;
334  4            END;
335  3            YMRQ:
                  END;
336  2        IF HORCADR THEN DO;
338  3            IF NOT H_HORS THEN RETURN NH AND 1;
340  3            IF NOT B_HORS THEN RETURN NB AND 1;
342  3            IF NOT G_HORS THEN RETURN NG AND 1;
344  3            IF NOT D_HORS THEN RETURN ND AND 1;
346  3        END;
347  2        IF NH THEN RETURN 1;
349  2        RETURN ZROFERM;
350  2    END PTSETAT;

351  1    STEPMR: PROC(ALPHA,PX,PY,MODUL) PUBLIC;
352  2        DCL ALPHA BYTE;
353  2        DCL (PX,PY) PTR;
354  2        DCL X BASED PX DWORD;
355  2        DCL Y BASED PY DWORD;
356  2        DCL MODUL WORD;
357  2        DO CASE SHR(ALPHA,6);
358  3            DO;
359  4                X=X+MODUL*COSX(ALPHA);
360  4                Y=Y-MODUL*COSY(40H-ALPHA);
361  4            END;
```

```
362   3            DO;
363   4                X=X-MODUL*COSX(80H-ALPHA);
364   4                Y=Y-MODUL*COSY(ALPHA-40H);
365   4            END;
366   3            DO;
367   4                X=X-MODUL*COSX(ALPHA-80H);
368   4                Y=Y+MODUL*COSY(0C0H-ALPHA);
369   4            END;
370   3            DO;
```

PL/M-86 COMPILER    RECONNAISSANCE

```
371   4                X=X+MODUL*COSX(-ALPHA);
372   4                Y=Y+MODUL*COSY(ALPHA-0C0H);
373   4            END;
374   3        END;
375   2    END STEPMR;

376   1    MOYARB: PROC(A,B) BYTE;
377   2        DCL (A,B,C) BYTE;
378   2        C=SHR(DOUBLE(A)+B,1);
379   2        IF DIFB(A,B)<80H THEN RETURN C;
381   2        RETURN C+80H;
382   2    END MOYARB;

383   1    VERIFIN: PROC BYTE;
384   2        DCL BOUT BYTE;
385   2        DCL DIFOR1 BYTE;
386   2        DCL (T,S,SDC,SGNBR,ASG,SGCNT,OCDP,DCFN,OBDP,OBFN,DCST,OBST) BYTE;
387   2        DCL (TMP,TMP1,TMP2) WORD;
388   2        DCL CNT(4) BYTE;
389   2        DCL IDC(16) BYTE;
390   2        DCL OBSSL(16) BYTE;
391   2        DCL (PERI,TW) WORD;
392   2        DCL (XXDC,YYDC,XDP,YDP,XPP,YPP) DWORD;
393   2        SDC=VTIDX;
394   2        ANGZX,EPAIX=BRU_VERI_TOLER;
395   2        ANGZY=ANGZX+SHR(ANGZX+2,2);
396   2        EPAIY=EPAIX+SHR(EPAIX+2,2);
397   2        XYSOM=ANGZX+SHR(ANGZX+1,1);
398   2        XXDC,DCX(0)=SHL(DOUBLE(XPOS),7);
399   2        YYDC,DCY(0)=SHL(DOUBLE(YPOS),7);
400   2        CALL SETB(0,@CNT(0),4);
401   2        DC(0)=SDC;
402   2        OB(0)=SSGANA;
403   2        ABSC(SDC)=XPOS;
404   2        COOR(SDC)=YPOS;
405   2        ASG=1;
406   2        DO T=SDC TO OBJ(OBJANA).SEG+SDC-2;
407   3            CALL STEPMR(OBJ(OBJANA).D(T)+ROTAT,@XXDC,@YYDC,OBJ(OBJANA).Z(T));
408   3            XLOC=LOW(SHR(XXDC,7)); YLOC=LOW(SHR(YYDC,7));
410   3            TMP=(T+1) MOD OBJ(OBJANA).SEG;
411   3            ABSC(TMP)=XLOC;
412   3            COOR(TMP)=YLOC;
413   3            IF (PTET:=PTSETAT(XLOC,YLOC))=3 THEN DO;
415   4                DC(ASG)=T+1;
416   4                OB(ASG)=PTI;
417   4                DCX(ASG)=XXDC;
418   4                DCY(ASG)=YYDC;
419   4                ASG=ASG+1;
420   4            END;
421   3            CNT(PTET)=CNT(PTET)+1;
422   3        END;
423   2        IF (SGNBR:=ASG)<MIN_SG_ID THEN RETURN FAUX;
425   2        OB(ASG)=SSGANA;
426   2        DC(ASG)=SDC+OBJ(OBJANA).SEG;
427   2        DCX(ASG)=DCX(0);
428   2        DCY(ASG)=DCY(0);
429   2        CALL SETW(0,@SUPLGR(0),rcnobj);
```

PL/M-86 COMPILER    RECONNAISSANCE

```
430   2        CALL SETB(0,@FLAGP(0),EXTSG);
431   2        CALL SETW(0,@PARTTMP(0),EXTSG);
432   2        PERI=0;
433   2        ANGZX,EPAIX=FIN_VERI_TOLER;
434   2        ANGZY=ANGZX+SHR(ANGZX+2,2);
435   2        EPAIY=EPAIX+SHR(EPAIX+2,2);
436   2        XYSOM=ANGZX+SHR(ANGZX+1,1);
```

```
437   3           DO ASG=0 TO SGNBR-1;
438   3               IF OB(ASG)=OB(ASG-1) THEN GOTO TERMINE;
439   3               DCDP=DC(ASG);
440   3               DCFN=DC(ASG+1);
441   3               OBDP=OB(ASG);
442   3               OBFN=OB(ASG+1);
443   3               DCFN=DCFN-1;
444   3               DCST=DCFN-DCDP;
445   3               IF OBFN>OBDP THEN OBST=OBFN-OBDP-1;
446   3               ELSE OBST=OBFN+PSEG-OBDP-1;
448   3               IF OBFN>PDSG THEN OBFN=OBFN-1;
449   3               ELSE OBFN=PFSG;
450   3               IF DCST=0 THEN DO;
452   3                   IF (T:=OBST)>2 THEN T=2;
454   4                   DO CASE T;
456   4                       DO;              /* T=0 */
457   5                           IF FLAG(OBDP)<>0FFH THEN
458   6                               IF PARTSG(OBDP)+1<2 THEN
459   6                                   SUPLGR(FLAG(OBDP))=SUPLGR(FLAG(OBDP))+SGLGR(OBDP);
460   6                               ELSE SUPLGR(FLAG(OBDP))=SUPLGR(FLAG(OBDP))+PARTSG(OBDP);
461   6                           FLAGP(OBDP)=OBJTROUVE;
462   6                           PERI=PERI+SGLGR(OBDP);
463   6                       END;
464   6                       DO;              /* T=1 */
465   5                           TW=DIFW(SGLGR(OBDP)+SGLGR(OBFN),OBJ(OBJANA).Z(DCDP));
466   6                           IF TW<NEGL_SGLGR THEN DO;
467   6                               IF FLAG(OBDP)<>0FFH THEN
469   7                                   IF PARTSG(OBDP)+1<2 THEN
470   7                                       SUPLGR(FLAG(OBDP))=SUPLGR(FLAG(OBDP))+SGLGR(OBDP)
471   7                                   ELSE SUPLGR(FLAG(OBDP))=SUPLGR(FLAG(OBDP))+PARTSG(O
472   7                               IF FLAG(OBFN)<>0FFH THEN IF PARTSG(OBFN)+1<2 THEN
473   7                                   SUPLGR(FLAG(OBFN))=SUPLGR(FLAG(OBFN))+SGLGR(OBFN);
475   7                               ELSE SUPLGR(FLAG(OBFN))=SUPLGR(FLAG(OBFN))+PARTSG(OB
476   7                               FLAGP(OBDP),FLAGP(OBFN)=OBJTROUVE;
477   7                               PERI=PERI+SGLGR(OBDP);
478   7                               PERI=PERI+SGLGR(OBFN);
479   7                           END;
480   7                           ELSE IF SGANG(OBDP)>80H THEN DO;
481   6                               XXDC=DCX(ASG);
483   7                               YYDC=DCY(ASG);
484   7                               CALL STEPMR(OBJ(OBJANA).D(DCDP)+ROTAT,@XXDC,@YYDC,SGLGR(
485   7                               XLOC=SHR(XXDC,7);
486   7                               YLOC=SHR(YYDC,7);
487   7                               TMP2=GRD7VERI(XLOC,YLOC,OBJ(OBJANA).D(DCDP)+ROTAT);
488   7                               IF TMP2-REC_GRD_SEUIL>80H THEN RETURN FAUX;
489   7                           END;
491   7                       END;
492   6                       DO;              /* T=2 */
493   5                           XDP=DCX(ASG);
494   6                           YDP=DCY(ASG);
495   6
```

PL/M-86 COMPILER        RECONNAISSANCE

```
496   6                           SGCNT=0;
497   6                           DO TW=1 TO OBJ(OBJANA).Z(DCDP) BY veri_step;
498   7                               XXDC=XDP;
499   7                               YYDC=YDP;
500   7                               CALL STEPMR(OBJ(OBJANA).D(DCDP)+ROTAT,@XXDC,@YYDC,TW);
501   7                               XLOC=SHR(XXDC,7);
502   7                               YLOC=SHR(YYDC,7);
503   7                               IF (PTET:=PTSETAT(XLOC,YLOC))>=2 THEN DO;
505   8                                   IF (TMP2:=PTI)<OBDP THEN TMP2=TMP2+PSEG;
507   8                                   IF TMP2-OBDP<=OBST AND
508   8                                       FINDB(@IDC(0),PTI,SGCNT)=0FFFFH THEN DO;
509   9                                       TMP2=ABSB(OBJ(OBJANA).D(DCDP)+ROTAT-SGORI(PTI));
510   9                                       IF TMP2<SML_ORIECAR OR
511   9                                           PETSG(PTI) AND TMP2<GRT_ORIECAR THEN DO;
512  10                                           TW=TW+SGLGR(PTI);
513  10                                           PERI=PERI+SGLGR(PTI);
514  10                                           IF FLAG(PTI)<>0FFH THEN IF PARTSG(PTI)+1<2 T
516  10                                               SUPLGR(FLAG(PTI))=SUPLGR(FLAG(PTI))+SGLG
517  10                                           ELSE SUPLGR(FLAG(PTI))=SUPLGR(FLAG(PTI))+PA
518  10                                           FLAGP(PTI)=OBJTROUVE;
519  10                                       END;
520   9                                       IDC(SGCNT)=PTI;
521   9                                       SGCNT=SGCNT+1;
522   9                                   END;
523   8                               END;
524   7                               ELSE IF PTET=0 AND TW>=SEG_BOUT AND
525   7                                   TW+SEG_BOUT<=OBJ(OBJANA).Z(DCDP) THEN DO;
```

```
526   8                              TMP2=GRD7VERI(XLOC,YLOC,OBJ(OBJANA).D(DCDP)+ROTAT);
527   8                              IF TMP2-REC_GRD_SEUIL>80H THEN RETURN FAUX;
529   8                            END;
530   7                          END;
531   6                        END;
532   5                      END;          /* DO CASE */
533   4                    END;            /* DCST=0 */
534   3                    ELSE IF OBST=0 AND DCST<3 THEN DO;
536   4                      TW=0;
537   4                      DO TMP=DCDP TO DCFN;
538   5                        TW=TW+OBJ(OBJANA).Z(TMP);
539   5                      END;
540   4                      IF (TMP:=DIFW(TW,SGLGR(OBDP)))<=NEGL_SGLGR THEN DO;
542   5                        IF FLAG(OBDP)<>0FFH THEN
543   5                          IF PARTSG(OBDP)+1<2 THEN
544   5                            SUPLGR(FLAG(OBDP))=SUPLGR(FLAG(OBDP))+SGLGR(OBDP);
545   5                          ELSE SUPLGR(FLAG(OBDP))=SUPLGR(FLAG(OBDP))+PARTSG(OBDP);
546   5                        FLAGP(OBDP)=OBJTROUVE;
547   5                        PERI=PERI+SGLGR(OBDP);
548   5                      END;
549   4                    END;
550   3                    ELSE DO;
551   4                      XDP=DCX(ASG);
552   4                      YDP=DCY(ASG);
553   4                      SGCNT=0;
554   4                      DO T=DCDP TO DCFN;
555   5                        DO TW=1 TO OBJ(OBJANA).Z(T) BY veri_step;
556   6                          BOUT=(TW<SEG_BOUT OR TW+SEG_BOUT>OBJ(OBJANA).Z(T));
557   6                          XXDC=XDP;
558   6                          YYDC=YDP;
```

PL/M-86 COMPILER     RECONNAISSANCE

```
559   6                          XLOC=SHR(XXDC,7);
560   6                          YLOC=SHR(YYDC,7);
562   6                          IF (PTET:=PTSETAT(XLOC,YLOC))>=2 THEN DO;
564   7                            IF (TMP2:=PTI)<OBDP THEN TMP2=TMP2+PSEG;
566   7                            IF TMP2-OBDP<=OBST THEN DO;
568   8                              DIFORI=ABSB(OBJ(OBJANA).D(T)+ROTAT-SGORI(PTI));
569   8                              IF (TMP2:=LOW(FINDB(@IDC(0),PTI,SGCNT)))=0FFH THEN
571   9                                IF DIFORI<SML_ORIECAR OR
572   9                                         BOUT AND DIFORI<GRT_ORIECAR THEN DO;
573   10                                 IDC(SGCNT)=PTI;
574   10                                 OBSGL(SGCNT)=veri_step;
575   10                                 SGCNT=SGCNT+1;
576   10                               END;
577   9                              END;
578   8                              ELSE IF DIFORI<SML_ORIECAR OR
                                          BOUT AND DIFORI<GRT_ORIECAR THEN
579   8                                OBSGL(TMP2)=OBSGL(TMP2)+veri_step;
580   8                            END;
581   7                          END;
582   6                          ELSE IF PTET=0 AND TW>=SEG_BOUT AND
583   6                                TW+SEG_BOUT<=OBJ(OBJANA).Z(T) THEN DO;
584   7                            TMP2=GRD7VERI(XLOC,YLOC,OBJ(OBJANA).D(T)+ROTAT);
585   7                            IF TMP2-REC_GRD_SEUIL>80H THEN RETURN FAUX;
587   7                          END;
588   6                        END;
589   5                        CALL STEPMR(OBJ(OBJANA).D(T)+ROTAT,@XDP,@YDP,OBJ(OBJANA).Z(T));
590   5                      END;
591   4                      IF SGCNT>0 THEN DO;
593   5                        DO TMP=0 TO SGCNT-1;
594   6                          TMP1=IDC(TMP);
595   6                          IF SGLGR(TMP1)<OBSGL(TMP)+NEGL_SGLGR THEN DO;
597   7                            IF FLAG(TMP1)<>0FFH THEN
598   7                              IF PARTSG(TMP1)+1<2 THEN
599   7                                SUPLGR(FLAG(TMP1))=SUPLGR(FLAG(TMP1))+SGLGR(TMP1);
600   7                              ELSE SUPLGR(FLAG(TMP1))=SUPLGR(FLAG(TMP1))+PARTSG(TMP1);
601   7                            PERI=PERI+SGLGR(TMP1);
602   7                          END;
603   6                          ELSE IF PARTSG(TMP1)<>0FFFFH THEN DO;
605   7                            IF PARTSG(TMP1)=0 THEN DO;
607   8                              PERI=PERI+OBSGL(TMP);
608   8                              PARTTMP(TMP1)=OBSGL(TMP);
609   8                            END;
610   7                            ELSE DO;
611   8                              PERI=PERI+SGLGR(TMP1)-PARTSG(TMP1);
612   8                              PARTTMP(TMP1)=0FFFFH;
613   8                            END;
614   7                          END;
615   6                          ELSE DO;
```

```
616   7                        SUPLGR(FLAG(TMP1))=SUPLGR(FLAG(TMP1))+OBSGL(TMP);
617   7                        PERI=PERI+OBSGL(TMP);
618   7                      END;
619   6                      FLAGP(TMP1)=OBJTROUVE;
620   6                      IF TMP+2=SGCNT AND OBSGL(TMP+1)=veri_step THEN DO;
622   7                        TMP=0F8H;
623   7                      END;
624   6                    END;
625   5                  END;
```

PL/M-86 COMPILER    RECONNAISSANCE

```
626   4                END;
627   3              TERMINE:
                    END;
628   2            IF PERI<OBJ(OBJANA).PERISL THEN RETURN FAUX;
630   2            FLGSSG(SSGANA)=FAUX;
631   2            DO ISG=PDSG TO PFSG;
632   3              IF FLAGP(ISG)<>OFFH THEN
633   3                IF FLAG(ISG)=OFFH THEN FLAG(ISG)=FLAGP(ISG);
635   3                ELSE FLAG1(ISG)=FLAGP(ISG);
636   3              PARTSG(ISG)=PARTSG(ISG) OR PARTTMP(ISG);
637   3            END;
638   2            IF FERME THEN DO;
640   3              FLAG(PDSG)=FLAG(PFSG);
641   3              FLAG(PFSG)=FLAG(PDSG);
642   3            END;
643   2            ELSE DO;
644   3              IF FLAG(PDSG)=OFFH AND PETSG(PDSG) AND (TMP:=FLAG(PDSG+1))<>OFFH THEN DO
646   4                FLAG(PDSG)=TMP;
647   4                PERI=PERI+SGLGR(PDSG);
648   4              END;
649   3              IF FLAG(PFSG)=OFFH AND PETSG(PFSG) AND (TMP:=FLAG(PFSG-1))<>OFFH THEN DO
651   4                FLAG(PFSG)=TMP;
652   4                PERI=PERI+SGLGR(PFSG);
653   4              END;
654   3            END;
655   2            DO ISG=PDSG TO PFSG;
656   3              IF PETSG(ISG) AND FLAG(ISG)=OFFH THEN DO;
658   4                IF FLAG(ISG-1)<>OFFH AND FLAG(ISG+1)<>OFFH THEN DO;
660   5                  FLAG(ISG)=0;
661   5                  PERI=PERI+SGLGR(ISG);
662   5                END;
663   4              END;
664   3              FLGSSG(ISG)=FLGSSG(ISG) AND (FLAG(ISG)=OFFH);
665   3            END;
666   2            PRESOBJ(OBJTROUVE).NUM=OBJANA;
667   2            PRESOBJ(OBJTROUVE).DBDC=SDC;
668   2            PRESOBJ(OBJTROUVE).ORI=ROTAT+OBJ(OBJANA).O(SDC);
669   2            PRESOBJ(OBJTROUVE).RPERI=PERI;
670   2            SUPERIM_SEUIL(OBJTROUVE)=SHR(SUPERIM*PERI+8,4);
671   2            IF (TMP:=OBJ(OBJANA).IP1)<OFFH THEN DO;
673   3              XPP=DOUBLE(ABSC(TMP));
674   3              YPP=DOUBLE(COOR(TMP));
675   3              XPP=SHL(XPP,5);
676   3              YPP=SHL(YPP,5);
677   3              CALL STEPMR(OBJ(OBJANA).O(TMP)+ROTAT,@XPP,@YPP,OBJ(OBJANA).IL1);
678   3              PRESOBJ(OBJTROUVE).XP1=LOW(SHR(XPP,5));
679   3              PRESOBJ(OBJTROUVE).YP1=LOW(SHR(YPP,5));
680   3              TMP=OBJ(OBJANA).IP2;
681   3              XPP=DOUBLE(ABSC(TMP));
682   3              YPP=DOUBLE(COOR(TMP));
683   3              XPP=SHL(XPP,5);
684   3              YPP=SHL(YPP,5);
685   3              CALL STEPMR(OBJ(OBJANA).O(TMP)+ROTAT,@XPP,@YPP,OBJ(OBJANA).IL2);
686   3              PRESOBJ(OBJTROUVE).XP2=LOW(SHR(XPP,5));
687   3              PRESOBJ(OBJTROUVE).YP2=LOW(SHR(YPP,5));
688   3            END;
689   2            PRESOBJ(OBJTROUVE).X=XPOS;
```

PL/M-86 COMPILER    RECONNAISSANCE

```
690   2            PRESOBJ(OBJTROUVE).Y=YPOS;
691   2            CALL MOVW(@SUPLGR(0),@CMUV(OBJTROUVE).CMUM(0),PCNOBJ);
692   2            IF OBJTROUVE=0 THEN DO;
694   3              OBJTROUVE=1;
695   3              PERIID=PERI;
696   3              RETURN VRAI;
697   3            END;
```

```
698   2        DO T=0 TO OBJTROUVE-1;
699   3          CMUV(T).CMUH(OBJTROUVE)=SUPLGR(T);
700   3          PRESOBJ(T).RSUP=PRESOBJ(T).RSUP+SUPLGR(T);
701   3          PRESOBJ(OBJTROUVE).RSUP=PRESOBJ(OBJTROUVE).RSUP+SUPLGR(T);
702   3        END;
703   2        PERIID=PERIID+PERI-PRESOBJ(OBJTROUVE).RSUP;
704   2        DO WHILE (T:=SUPROBJ)<>OFFH;
705   3          DO ISG=PDSG TO PFSG;
706   4            IF FLAG(ISG)<>OFFH THEN DO;
708   5              IF FLAG(ISG)=T THEN DO;
710   6                IF FLAG1(ISG)=OFFH THEN FLAG(ISG),FLGSSS(ISG)=OFFH;
712   6                ELSE DO;
713   7                  FLAG(ISG)=FLAG1(ISG);
714   7                  FLAG1(ISG)=OFFH;
715   7                  IF FLAG(ISG)>T THEN FLAG(ISG)=FLAG(ISG)-1;
717   7                END;
718   6                PARTSG(ISG)=0;
719   6              END;
720   5              ELSE IF FLAG(ISG)>T THEN FLAG(ISG)=FLAG(ISG)-1;
722   5              IF FLAG1(ISG)<>OFFH THEN DO;
724   6                IF FLAG1(ISG)=T THEN DO;
726   7                  FLAG1(ISG)=0;
727   7                  PARTSG(ISG)=0;
728   7                END;
729   6                ELSE IF FLAG1(ISG)>T THEN FLAG1(ISG)=FLAG1(ISG)-1;
731   6              END;
732   5            END;
733   4          END;
734   3          PERIID=PERIID+PRESOBJ(T).RSUP-PRESOBJ(T).RPERI;
735   3          DO S=0 TO OBJTROUVE;
736   4            PRESOBJ(S).RSUP=PRESOBJ(S).RSUP-CMUV(S).CMUH(T);
737   4            CALL MOVW(@CMUV(S).CMUH(T+1),@CMUV(S).CMUH(T),OBJTROUVE-T);
738   4          END;
739   3          CALL MOVW(@CMUV(T+1).CMUH(0),@CMUV(T).CMUH(0),rcnobj*(OBJTROUVE-T));
740   3          CALL MOVB(@PRESOBJ(T+1),@PRESOBJ(T),SIZE(PRESOBJ(0))*(OBJTROUVE-T));
741   3          CALL MOVW(@SUPERIM_SEUIL(T+1),@SUPERIM_SEUIL(T),OBJTROUVE-T);
742   3          CALL SETB(0,@PRESOBJ(OBJTROUVE),SIZE(PRESOBJ(0)));
743   3          OBJTROUVE=OBJTROUVE-2;
744   3        END;
745   2        OBJTROUVE=OBJTROUVE+1;
746   2        RETURN VRAI;
747   2      END VERIFIN;

748   1      GRD7VERI: PROC(X,Y,DIR) BYTE;
749   2        DCL (X,Y) WORD;
750   2        DCL (DIR,HH,BB,DIRFRM) BYTE;
751   2        DIRFRM=SHR(DIR+16,5);
752   2        DO CASE DIRFRM AND 3;
753   3          DO;                     /* 0 */
754   4            HH=TA(X-1,Y+4)+TA(X+1,Y+4)+TA(X,Y+4);
```

```
755   4            BB=TA(X+1,Y-4)+TA(X-1,Y-4)+TA(X,Y-4);
756   4          END;
757   3          DO;                     /* 1 */
758   4            HH=TA(X+1,Y+4)+TA(X+2,Y+3)+TA(X+3,Y+1);
759   4            BB=TA(X-1,Y-4)+TA(X-2,Y-3)+TA(X-3,Y-1);
760   4          END;
761   3          DO;                     /* 2 */
762   4            HH=TA(X+3,Y-1)+TA(X+3,Y)+TA(X+3,Y+1);
763   4            BB=TA(X-3,Y-1)+TA(X-3,Y)+TA(X-3,Y+1);
764   4          END;
765   3          DO;                     /* 3 */
766   4            HH=TA(X+1,Y-4)+TA(X+2,Y-3)+TA(X+3,Y-1);
767   4            BB=TA(X-1,Y+4)+TA(X-2,Y+3)+TA(X-3,Y+1);
768   4          END;
769   3        END;
770   2        IF DIRFRM<4 THEN RETURN HH-BB;
772   2        RETURN BB-HH;
773   2      END GRD7VERI;

774   1      SUPROBJ: PROC BYTE;
775   2        DCL (T,R) BYTE;
776   2        DCL (S,SUPMAX,TW,SW) WORD;
777   2        DCL SUPTAUX(rcnobj) WORD;
778   2        CALL SETW(0,@SUPTAUX(0),OBJTROUVE);
779   2        SUPMAX=OFFFFH;
780   2        DO T=0 TO OBJTROUVE;
781   3          IF PRESOBJ(T).RSUP>SUPERIM_SEUIL(T) THEN DO;
```

```
783   4                    IF PRESOBJ(T).RPERI<1024 THEN DO;
785   5                        TW=SHL(PRESOBJ(T).RPERI,6);
786   5                        SW=PRESOBJ(T).RSUP;
787   5                      END;
788   4                    ELSE DO;
789   5                        TW=PRESOBJ(T).RPERI;
790   5                        SW=SHR(PRESOBJ(T).RSUP+32,6);
791   5                      END;
792   4                    IF (S:=(TW+SHR(SW,1))/SW)<SUPMAX THEN DO;
794   5                        R=T;
795   5                        SUPMAX=S;
796   5                      END;
797   4                    SUPTAUX(T)=S;
798   4                  END;
799   3                END;
800   2              IF SUPMAX=0FFFFH THEN RETURN 0FFH;
802   2              RETURN R;
803   2            END SUPROBJ;

804   1            AJUST: PROC BYTE;
                   /* INPUT:  rotat, vtrtn, objana, sssana, vtana. */
                   /* OUTPUT: rotat, xpos, ypos.                   */
805   2              DCL (NEG,NEGX,NEGY) BYTE;
806   2              DCL (VTSG,VALUEPT,DICPST,OBPST,CORR,SDC,IOB,IDC) BYTE;
807   2              DCL (AVECAR,APECAR) BYTE;
808   2              DCL (TMP,TMP1,TMP2,TMP3) WORD;
809   2              DCL (DIRACC,SOM,TW,XECAR,YECAR) WORD;
810   2              DCL (XXDC,YYDC) DWORD;
811   2              CALL SETB(0,@VALANG(16),vtseg);
812   2              VALUEPT,DIRACC=0;
```

PL/M-86 COMPILER    RECONNAISSANCE

```
813   2              VTSG=0;
814   2              DO WHILE VTSG<VTSGEXM AND VT(VTANA).L(VTSG)<>0;
815   3                IF (IOB:=VTRTN(VTSG))<>0FFH THEN DO;
817   4                  IF (IDC:=VT(VTANA).I(VTSG))=0 THEN DICPST=OBJ(OBJANA).SEG-1;
819   4                  ELSE DICPST=IDC-1;
820   4                  OBPST=IOB-1;
821   4                  AVECAR=ABSB(SGORI(OBPST)-OBJ(OBJANA).D(DICPST)-ROTAT);
822   4                  APECAR=ABSB(SGORI(IOB)-OBJ(OBJANA).D(IDC)-ROTAT);
823   4                  IF AVECAR<GRT_AJUECAR OR APECAR<GRT_AJUECAR THEN DO;
825   5                    TMP=TANGENT(PICX(SSSANA),PICY(SSSANA),PICX(IOB),
                               PICY(IOB))-VT(VTANA).A1(VTSG+IDA)-DEPORI;
826   5                    IF TMP<80H THEN TW=TMP;
828   5                    ELSE TW=0FF00H OR TMP;
829   5                    IF AVECAR<SML_AJUECAR XOR APECAR<SML_AJUECAR THEN DO;
831   6                        SOM=SHL(TW,1);
832   6                        VALUEPT=VALUEPT+2;
833   6                        VALANG(VTSG)=2;
834   6                      END;
835   5                    ELSE IF AVECAR<SML_AJUECAR THEN DO;
837   6                        IF ABSB(SGANG(IOB))>32 THEN DO;
839   7                            SOM=6*TW;
840   7                            VALUEPT=VALUEPT+6;
841   7                            VALANG(VTSG)=6;
842   7                          END;
843   6                        ELSE DO;
844   7                            SOM=3*TW;
845   7                            VALUEPT=VALUEPT+3;
846   7                            VALANG(VTSG)=3;
847   7                          END;
848   6                      END;
849   5                    ELSE DO;
850   6                        SOM=TW;
851   6                        VALUEPT=VALUEPT+1;
852   6                        VALANG(VTSG)=1;
853   6                      END;
854   5                    DIRACC=DIRACC+SOM;
855   5                  END;
856   4                END;
857   3                VTSG=VTSG+1;
858   3              END;
859   2              IF VALUEPT<MIN_VALUEPT THEN RETURN FAUX;
861   2              IF (NEG:=(DIRACC>8000H)) THEN DIRACC=-DIRACC;
863   2              CORR=(DIRACC+SHR(VALUEPT,1))/VALUEPT;
864   2              IF NEG THEN CORR=-CORR;
866   2              ROTAT=ROTAT+CORR;

867   2              SDC=VTIDX;
868   2              VALUEPT=0;
```

```
869  2        XECAR,YECAR=0;
870  2        VTSG=0;
871  2        DO WHILE VTSG<VTIDX;
872  3           XXDC=SHL(DOUBLE(PICX(SSGANA)),5);
873  3           YYDC=SHL(DOUBLE(PICY(SSGANA)),5);
874  3           CALL STEPMR(VT(VTANA).A1(VTSG+IDA)+DEPORI+CORR,@XXDC,@YYDC,VT(VTANA).L(V
875  3           XLOC=SHR(XXDC,5);
876  3           YLOC=SHR(YYDC,5);
877  3           ANGZX=AJU_TOLER+SHR(VT(VTANA).L(VTSG)+aju_corri,aju_elast);
```

PL/M-86 COMPILER    RECONNAISSANCE

```
878  3           EPAIX=ANGZX-epais_eros;
879  3           ANGZY=ANGZX+SHR(ANGZX+2,2);              /* forme fix. dependant */
880  3           EPAIY=EPAIX+SHR(EPAIX+2,2);              /*      .....           */
881  3           XYSOM=ANGZX+SHR(ANGZX+1,1);
882  3           PTET=PTSETAT(XLOC,YLOC);
883  3           IF PTET=2 THEN DO;
885  4               IF (TMP:=VT(VTANA).I(VTSG))=0 THEN TMP=OBJ(OBJANA).SEG-1;
887  4               ELSE TMP=TMP-1;
888  4               TMP1=OBJ(OBJANA).D(VT(VTANA).I(VTSG));
889  4               TMP2=OBJ(OBJANA).D(TMP);
890  4               TMP3=GRD7VERI(XLOC,YLOC,MOYANG(TMP1,TMP2)+ROTAT);
891  4               IF TMP3-REC_GRD_SEUIL>80H THEN RETURN FAUX;
893  4           END;
894  3           ELSE IF PTET=3 AND (VALANG(VTSG)>0) THEN DO;
896  4               VALUEPT=VALUEPT+VALANG(VTSG);
897  4               XECAR=XECAR+VALANG(VTSG)*PICX(PTI);
898  4               XECAR=XECAR-VALANG(VTSG)*XLOC;
899  4               YECAR=YECAR+VALANG(VTSG)*PICY(PTI);
900  4               YECAR=YECAR-VALANG(VTSG)*YLOC;
901  4           END;
902  3           VTSG=VTSG+1;
903  3        END;
904  2        IF (NEGX:=(XECAR>8000H)) THEN XECAR=-XECAR;
906  2        IF (NEGY:=(YECAR>8000H)) THEN YECAR=-YECAR;
908  2        IF VALUEPT<MIN_VALUEPT THEN RETURN FAUX;
910  2        XCORR=(XECAR+SHR(VALUEPT,1))/VALUEPT;
911  2        YCORR=(YECAR+SHR(VALUEPT,1))/VALUEPT;
912  2        IF NEGX THEN XPOS=PICX(SSGANA)-XCORR;
914  2        ELSE XPOS=PICX(SSGANA)+XCORR;
915  2        IF NEGY THEN YPOS=PICY(SSGANA)-YCORR;
917  2        ELSE YPOS=PICY(SSGANA)+YCORR;
918  2        RETURN VRAI;
919  2    END AJUST;

920  1    VTTEST: PROC BYTE;
921  2        DCL (T,TMP,DCSGL0,DCSGA1,DCSGA7,DCSGL7) BYTE;
922  2        IF PSGTYP(SSGORD) THEN DO;
924  3           IF (DCSGL0:=OBJ(OBJANA).Z(VTIDX))<NEGL_SGLGR THEN RETURN FAUX;
926  3           IF DCSGL0>=SGLGR(SSGANA)+DEPASS AND
927  3              SGANG(SSGANA+1)<80H AND SGANG(SSGANA+1)>REC_ECART THEN RETURN FAUX;
928  3           ELSE IF DCSGL0+DEPASS<=SGLGR(SSGANA) AND
                    (DCSGA1:=OBJ(OBJANA).A(VTIDX+1))>80H AND -DCSGA1>REC_ECART THEN
929  3              RETURN FAUX;
930  3           DEPORI=SGORI(SSGANA);
931  3           ROTAT=DEPORI-VT(VTANA).ORI1;
932  3           IDA=0;
933  3        END;
934  2        ELSE DO;
935  3           IF VTIDX=0 THEN TMP=OBJ(OBJANA).SEG-1;
937  3           ELSE TMP=VTIDX-1;
938  3           IF (DCSGL7:=OBJ(OBJANA).Z(TMP))<NEGL_SGLGR THEN RETURN FAUX;
940  3           IF DCSGL7>=SGLGR(SSGAN7)+DEPASS AND
941  3              SGANG(SSGAN7)<80H AND SGANG(SSGAN7)>REC_ECART THEN RETURN FAUX;
942  3           ELSE IF DCSGL7+DEPASS<=SGLGR(SSGAN7) AND (DCSGA7:=OBJ(OBJANA).A(TMP))>80H
943  3              AND -DCSGA7>REC_ECART THEN RETURN FAUX;
944  3           DEPORI=SGORI(SSGAN7);
945  3           ROTAT=VT(VTANA).ORI2;
```

PL/M-86 COMPILER    RECONNAISSANCE

```
946  3           IDA=vtseg;
947  3        END;
948  2        RETURN VRAI;
949  2    END VTTEST;

950  1    VTFIND: PROC BYTE;
951  2        DCL (VTSG,CNT3,TMP,TMP1,TMP2,TMP3) BYTE;
```

```
952   2      DCL (XXDC,YYDC) DWORD;
953   2      CALL SETB(0FFH,@VTRTN(0),VTSGEXM);
954   2      VTSG,CNT3=0;
955   2      DO WHILE VTSG<VTSGEXM AND VT(VTANA).L(VTSG)<>0;
956   3          XXDC=SHL(DOUBLE(PICX(SSGANA)),7);
957   3          YYDC=SHL(DOUBLE(PICY(SSGANA)),7);
958   3          CALL STEPMR(VT(VTANA).A1(VTSG+IDX)+DEPORI,@XXDC,@YYDC,VT(VTANA).L(VTSG);
959   3          XLOC=SHR(XXDC,7);
960   3          YLOC=SHR(YYDC,7);
961   3          ANGZX=VTF_TOLER+SHR(VT(VTANA).L(VTSG),vtf_elast);
962   3          EPAIX=ANGZX-epais_zeros;
963   3          ANGZY=ANGZX+SHR(ANGZX+2,2);
964   3          EPAIY=EPAIX+SHR(EPAIX+2,2);
965   3          XYSOM=ANGZX+SHR(ANGZX+1,1);
966   3          PTET=PTSETAT(XLOC,YLOC);
967   3          IF PTET=0 THEN IF CNT3<3 THEN DO;
970   4              IF (TMP:=VT(VTANA).I(VTSG))=0 THEN TMP=OBJ(OBJANA).SEG-1;
972   4              ELSE TMP=TMP-1;
973   4              TMP1=OBJ(OBJANA).D(VT(VTANA).I(VTSG));
974   4              TMP2=OBJ(OBJANA).D(TMP);
975   4              TMP3=GRD7VERI(XLOC,YLOC,MOYANG(TMP1,TMP2)+ROTAT);
976   4              IF TMP3-REC_GRD_SEUIL>80H THEN RETURN FAUX;
978   4          END;
979   3          ELSE RETURN FAUX;
980   3          ELSE IF PTET=3 THEN DO;
982   4              VTRTN(VTSG)=PTI;
983   4              CNT3=CNT3+1;
984   4          END;
985   3          VTSG=VTSG+1;
986   3      END;
987   2      RETURN VRAI;
988   2      END VTFIND;

/*********************/

989   1      IDENT: PROC PUBLIC;
990   2      DCL (T,S) BYTE;
991   2      OBJTROUVE=0;
992   2      IF IOM=0 THEN RETURN;
994   2      IF FERME OR HORCADR THEN ZROFERM=0;
996   2      ELSE ZROFERM=1;
997   2      CALL SETB(0,@PRESOBJ(0),rcnobj*SIZE(PRESOBJ(0)));
998   2      CALL SETB(0FFH,@FLAG(0),EXTSG);
999   2      CALL SETB(0FFH,@FLAG1(0),EXTSG);
1000  2      CALL SETB(0,@FLSGSSG(0),EXTSG);
1001  2      CALL SETW(0,@PARTSG(0),EXTSG);
1002  2      PERIID=0;
1003  2      SSGEXM=NSSG;
1004  2      DO SSGORD=0 TO SSGEXM-1;
1005  3          SSGANA=PSSG(SSGORD);
1006  3          IF FLGSSG(SSGANA) THEN DO VTORD=0 TO VTEXM-1;
1008  4              DO OBJETORD=0 TO IOM-1;
1009  5                  OBJANA=OBJORD(OBJETORD);
1010  5                  IF VTORD<OBJ(OBJANA).VTNBR THEN DO;
1012  6                      VTANA=vtparobj*OBJANA+VTORD;
1013  6                      VTIDX=VT(VTANA).IDX;
1014  6                      SSGAN7=SSGANA-1;
1015  6                      IF VTTEST THEN DO;
```

```
1017  7                          IF VTFIND THEN
1018  7                              IF AJUST THEN
1019  7                                  IF VERIFIN THEN OBJETORD,VTORD=0F8H;
1021  7                          END;
1022  6                      END;
1023  5                      ELSE OBJETORD=0F8H;
1024  5                  END;
1025  4              END;
1026  3              IF PPERI<PERIID+NEGLIGE_PERIM THEN SSGORD=0F8H;
1028  3          END;
1029  2          IF SSGORD=SSGEXM THEN DO;
1031  3              PRESOBJ(OBJTROUVE).NUM=0FFH;
1032  3              OBJTROUVE=OBJTROUVE+1;
1033  3          END;
1034  2      END IDENT;

1035  1      END RECONNAISSANCE;
```

MODULE INFORMATION:

CODE AREA SIZE      = 2F1CH   12060D
    CONSTANT AREA SIZE  = 0082H     178D
    VARIABLE AREA SIZE  = 098EH    2446D
    MAXIMUM STACK SIZE  = 001EH      30D
    1077 LINES READ
    0 PROGRAM WARNINGS
    0 PROGRAM ERRORS

DICTIONARY SUMMARY:

25KB MEMORY AVAILABLE
    20KB MEMORY USED    (81%)
    0KB DISK SPACE USED

END OF PL/M-86 COMPILATION

PL/M-86 COMPILER    SEGMENTATION

SERIES-III PL/M-86 V2.7 COMPILATION OF MODULE SEGMENTATION
OBJECT MODULE PLACED IN :F2:VXSEGM.OBJ
COMPILER INVOKED BY:  PLM86.86 :F2:VXSEGM.SRC DEBUG

```
            /*****************************************************************/
            $LARGE
    1       SEGMENTATION: DO;
            $NOLIST INCLUDE(:F1:PLMLIB.SRC)
            $NOLIST INCLUDE(:F2:SOFPUB.LIT)
            $NOLIST INCLUDE(:F2:VXUTIL.EXT)

88    1    DCL XTBLCARRE BYTE PUBLIC;

89    1    DCL PLSG(lssnbr) BYTE PUBLIC;
 90    1    DCL PSSG(sssnbr) BYTE PUBLIC;
 91    1    DCL PSUTIP(sssnbr) BYTE PUBLIC;
 92    1    DCL (SGANG,
                 SGORI)(segreleve) BYTE PUBLIC;
 93    1    DCL SGLGR(segreleve) WORD PUBLIC;
 94    1    DCL (PIC,
                 PICX,
                 PICY)(segreleve) WORD PUBLIC;
 95    1    DCL PETSG(segreleve) BYTE PUBLIC;
 96    1    DCL (HORCADR,H_HORS,B_HORS,G_HORS,D_HORS) BYTE PUBLIC;
 97    1    DCL (PICVAL,PLATVAL,PLATLARG,ECARSEUIL,SEGSL,MINSH,MOITIE,
                 BORD,ANGSGNF) WORD PUBLIC;    /* seuils */
 98    1    DCL (LEARN,PSEG,PFSG,EXTSG,NLSG,NSSG,PTPRIS) BYTE PUBLIC;
 99    1    DCL (BXG,BXD,BYH,BYB,PFERI) WORD PUBLIC;
100    1    DCL IP(2) BYTE PUBLIC;
101    1    DCL IL(2) WORD PUBLIC;

102    1    DCL NBRPIC BYTE;
103    1    DCL (N0,N1)(2000) BYTE PUBLIC;
104    1    DCL (N2,N3)(2000) WORD;
105    1    DCL (N0NBR,N1NBR,N2NBR,IPRIS1,IPRIS2,ANGSEC) WORD;

106    1    DCL DERIV(64) BYTE DATA(0,2,5,8,80H,-8,-5,-2, -2,0,3,6,8,80H,-7,-4,
              -5,-3,0,3,5,7,80H,-7, -8,-6,-3,0,2,4,7,80H, 80H,-8,-5,-2,0,3,5,8,
              8,80H,-7,-4,-2,0,3,6,  5,7,80H,-7,-5,-3,0,3, 2,4,7,80H,-8,-6,-3,0);

107    1    DCL CAR(tablecarre) WORD DATA(
               0,    1,    4,    9,   16,   25,   36,   49,   64,   81,
             100,  121,  144,  169,  196,  225,  256,  289,  324,  361,
             400,  441,  484,  529,  576,  625,  676,  729,  784,  841,
             900,  961, 1024, 1089, 1156, 1225, 1296, 1369, 1444, 1521,
            1600, 1681, 1764, 1849, 1936, 2025, 2116, 2209, 2304, 2401,
            2500, 2601, 2704, 2809, 2916, 3025, 3136, 3249, 3364, 3481,
            3600, 3721, 3844, 3969, 4096, 4225, 4356, 4489, 4624, 4761,
            4900, 5041, 5184, 5329, 5476, 5625, 5776, 5929, 6084, 6241,
```

```
                        6400, 6561, 6724, 6889, 7056, 7225, 7396, 7569, 7744, 7921,
                        8100, 8281, 8464, 8649, 8836, 9025, 9216, 9409, 9604, 9801,
                        10000,10201,10404,10609,10816,11025,11236,11449,11664,11881,
                        12100,12321,12544,12769,12996,13225,13456,13689,13924,14161,
                        14400,14641,14884,15129,15376,15625,15876,16129,16384,16641,
                        16900,17161,17424,17689,17956,18225,18496,18769,19044,19321,
                        19600,19881,20164,20449,20736,21025,21316,21609,21904,22201,
                        22500,22801,23104,23409,23716,24025,24336,24649,24964,25281,
                        25600,25921,26244,26569,26896,27225,27556,27889,28224,28561,
                        28900,29241,29584,29929,30276,30625,30976,31329,31684,32041,
                        32400,32761);

108  1     DCL XCAR(tablecarre) WORD PUBLIC;
109  1     DCL ATHX(256) BYTE PUBLIC;
110  1     DCL ATHY(256) BYTE PUBLIC;

111  1     DCL ECARN(129) BYTE DATA (
                        0,3,6,9,13,16,19,22,25,28,31,34,38,41,44,47,50,53,56,
                        59,62,65,68,71,74,77,80,83,86,89,92,95,98,101,104,107,109,112,115,118,1
                        123,126,129,132,134,137,140,142,145,147,150,152,155 157,160,162,165,167,
                        170,172,174,177,179,181,183,185,188,190,192,194,196,198,200,202,204,206,
                        207,209,211,213,215,216,218,220,221,223,224,226,227,229,230,231,233,234,
                        235,237,238,239,240,241,242,243,244,245,246,247,248,248,249,250,250,251,
                        252,252,253,253,254,254,254,255,255,255,255,255,255,255,255,255,255);

112  1     RAC: PROC(X) WORD;
113  2       DCL (X,I) WORD;
114  2       DCL DIV BYTE;
115  2       IF DIV:=(X>=32767) THEN X=SHR(X+2,2);
117  2       I=HIGH(X);      /* RAC(X)>X*2^-8 si X<32768 */
118  2       DO WHILE X>CAR(I);
119  3          I=I+1;
120  3       END;
121  2       IF I>0 AND X<=CAR(I-1)+I-1 THEN I=I-1;
123  2       IF DIV THEN RETURN SHL(I,1);
125  2       RETURN I;
126  2     END RAC;

127  1     MODUL: PROC(X,Y) WORD PUBLIC;
128  2       DCL (DIV2,DIV4) BYTE;
129  2       DCL (X,Y,TW) WORD;
130  2       IF DIV2:=(X>=XTBLCARRE OR Y>=tablecarre) THEN DO;
132  3          IF DIV4:=(SHR(X,1)>=XTBLCARRE OR SHR(Y,1)>=tablecarre) THEN DO;
134  4             IF X>=resolution OR Y>=resolution THEN RETURN 0FFFFH;
136  4             X=SHR(X+2,2);
137  4             Y=SHR(Y+2,2);
138  4          END;
139  3          ELSE DO;
140  4             X=SHR(X,1);
141  4             Y=SHR(Y,1);
142  4          END;
143  3       END;
144  2       TW=RAC(XCAR(X)+CAR(Y));
145  2       IF DIV2 THEN DO;
147  3          IF DIV4 THEN RETURN SHL(TW,2);
149  3          RETURN SHL(TW,1);
150  3       END;
151  2       RETURN TW;
152  2     END MODUL;

153  1     DIFW: PROC(A,B) WORD;
154  2       DCL (A,B) WORD;
155  2       IF A>B THEN RETURN A-B;
157  2       ELSE RETURN B-A;
158  2     END DIFW;

159  1     ABSB: PROC(A) BYTE;
160  2       DCL A BYTE;
161  2       IF A<80H THEN RETURN A;
163  2       ELSE RETURN -A;
164  2     END ABSB;

165  1     DIFB: PROC(A,B) BYTE;
```

```
166   2      DCL (A,B) BYTE;
167   2      IF A>B THEN RETURN A-B;
169   2      ELSE RETURN B-A;
170   2      END DIFB;

171   1    BYTWSGN: PROC(A) WORD;
172   2      DCL A BYTE;
173   2      IF A<80H THEN RETURN DOUBLE(A);
175   2      ELSE RETURN OFF00H OR A;
176   2      END BYTWSGN;

177   1    CONV4: PROC(PDEP) WORD;
178   2      DCL PDEP PTR;
179   2      DCL CHN BASED PDEP(1) BYTE;
180   2      RETURN BYTWSGN(CHN(0))+BYTWSGN(CHN(3))+SHL(BYTWSGN(CHN(1))+BYTWSGN(CHN(2));
181   2      END CONV4;

182   1    TANGENT: PROC(XD,YD,XF,YF) BYTE PUBLIC;
183   2      DCL (T,XPOS,YPOS) BYTE;
184   2      DCL (XD,XF,YD,YF,ABSXX,ABSYY) WORD;
185   2      IF XPOS:=(XF>=XD) THEN ABSXX=XF-XD;
187   2      ELSE ABSXX=XD-XF;
188   2      IF YPOS:=(YF<YD) THEN ABSYY=YD-YF;
190   2      ELSE ABSYY=YF-YD;
191   2      IF ABSXX>ABSYY THEN T=ATNY((SHL(ABSYY,8)+SHR(ABSYX,1))/ABSXX);
193   2      ELSE IF ABSXX=ABSYY THEN T=27;
195   2      ELSE T=ATNX((SHL(ABSXX,8)+SHR(ABSYY,1))/ABSYY);
196   2      IF YPOS THEN DO;
198   3         IF NOT XPOS THEN RETURN 80H-T;
200   3      END;
201   2      ELSE IF XPOS THEN RETURN -T;
203   2      ELSE RETURN T+80H;
204   2      RETURN T;
205   2      END TANGENT;

************************************************************

206   1    SEGMENT: PROC BYTE PUBLIC;

207   2      DCL (I,J,SPX,A,APP,XCOR,YCOR,IMAX,LL,M) WORD;
208   2      DCL (S,T,R,DX0,DX1,DY0,DY1,FX0,FX1,FY0,FY1,AV,AR,TMP1,TMP2,
                    ISEG,IDX,IDAV,SCRP,SCR,CORRI,ALP1) BYTE;

/* transformation des codes FREEMAN */
209   2      N2NBR=AF(L)-AD(L)+1;
210   2      CALL MOVB(@FREEM(AD(L)),@N0(0),N2NBR);
211   2      N0(N2NBR),N0(0)=N0(0) AND 7;
212   2      DO I=0 TO N2NBR-1;

PL/M-86 COMPILER    SEGMENTATION 213   3         N0(I)=SHL(N0(I),3) OR (N0(I+1):=N0(I+1) AND 7);
214   3      END;
215   2      N2NBR=512;
216   2      IF NOT FERME THEN N2NBR=N2NBR-1;
218   2      N1NBR=N2NBR;
219   2      IF FINDB(@N1(0),80H,N1NBR)<>OFFFFH THEN RETURN 1;
221   2      XCOR=TDX(L); YCOR=TDY(L);
223   2      SPX=0;
224   2      CALL SETW(0,@N0(0),1000);
225   2      CALL SETW(0,@N2(0),2000);
226   2      N2(0),BXG,BXD=XCOR;
227   2      N3(0),BYH,BYB=YCOR;
228   2      DO APP=0 TO N1NBR-1;
229   3         A=APP+AD(L);
230   3         SPX=SPX+1;
231   3         I=SPX;
232   3         IF PTPRIS THEN DO;
234   4            IF A=AP(0) THEN IPRIS1=I;
236   4            IF A=AP(1) THEN IPRIS2=I;
238   4         END;
239   3         IF N1(APP)<>0 THEN DO;
241   4            S=SPX AND 3;
242   4            DO CASE S;
243   5               N0(I)=N0(I)+SHL(N1(APP),2);
244   5               DO;
245   6                  N0(I+1)=N0(I+1)+N1(APP);
246   6                  N0(I)=N0(I)+3*N1(APP);
247   6               END;
248   5               DO;
```

```
249   6                        NO(I+1)=NO(I+1)+SHL(N1(APP),1);
250   6                        NO(I)=NO(I)+SHL(N1(APP),1);
251   6                      END;
252   5                    DO;
253   6                      NO(I)=NO(I)+N1(APP);
254   6                      NO(I+1)=NO(I+1)+3*N1(APP);
255   6                    END;
256   5                  END;
257   4                END;
258   3                N2(I)=XCOR;
259   3                N3(I)=YCOR;
260   3                DO CASE FREEM(A) AND 7;
261   4                    XCOR=XCOR+1;
262   5                    DO; XCOR=XCOR+1; YCOR=YCOR-1; END;
266   4                    YCOR=YCOR-1;
267   5                    DO; XCOR=XCOR-1; YCOR=YCOR-1; END;
271   4                    XCOR=XCOR-1;
272   5                    DO; XCOR=XCOR-1; YCOR=YCOR+1; END;
276   4                    YCOR=YCOR+1;
277   5                    DO; XCOR=XCOR+1; YCOR=YCOR+1; END;
281   4                END;
282   3                IF XCOR<BXG THEN BXG=XCOR;
284   3                ELSE IF XCOR>BXD THEN BXD=XCOR;
286   3                IF YCOR<BYH THEN BYH=YCOR;
288   3                ELSE IF YCOR>BYB THEN BYB=YCOR;
290   3              END;
291   2              NONBR,N2NBR=SHR(SFX,2)+SHR(S,1);
292   2              DO I=1 TO N2NBR-1;
```

PL/M-86 COMPILER      SEGMENTATION

```
293   3                IF N2(I)=0 THEN DO;
295   4                  N2(I)=N2(I-1);
296   4                  N3(I)=N3(I-1);
297   4                END;
298   3              END;
299   2              IF FERME THEN HORCADR,H_HORS,B_HORS,G_HORS,D_HORS=FAUX;
301   2              ELSE DO;
302   3                DX0=TDX(L)<BORD;
303   3                DY0=TDY(L)<BORD;
304   3                DX1=TDX(L)>resolution-BORD;
305   3                DY1=TDY(L)>resolution-BORD;
306   3                FX0=TFX(L)<BORD;
307   3                FY0=TFY(L)<BORD;
308   3                FX1=TFX(L)>resolution-BORD;
309   3                FY1=TFY(L)>resolution-BORD;
310   3                IF HORCADR:=((DX0 OR DY0 OR DX1 OR DY1) AND (FX0 OR FY0 OR FX1 OR FY1))
312   4                  H_HORS=DY0 OR FY0;
313   4                  B_HORS=DY1 OR FY1;
314   4                  G_HORS=DX0 OR FX0;
315   4                  D_HORS=DX1 OR FX1;
316   4                END;
317   3                ELSE H_HORS,B_HORS,G_HORS,D_HORS=VRAI;
318   3              END;

/* filtrage */
319   2              DO I=2 TO NONBR-2;
320   3                N1(I)=LOW(ENO(I-2));
321   3              END;
322   2              N1NBR=NONBR;
323   2              N1(0)=BYTWSGN(NO(1))+SHL(BYTWSGN(NO(0)),1);
324   2              N1(1)=BYTWSGN(NO(2))+SHL(BYTWSGN(NO(0))+BYTWSGN(NO(1)),1);
325   2              N1(N1NBR-1)=BYTWSGN(NO(NONBR-3))+SHL(BYTWSGN(NO(NONBR-2))+BYTWSGN(NO(NONBR /* chercher les points angulaires */
326   2              IF FERME THEN DO;
328   3                NO(NONBR)=80H;
329   3                N1(N1NBR)=N1(0);
330   3                N2(N2NBR)=N2(0);
331   3                N3(N2NBR)=N3(0);
332   3              END;
333   2              ELSE DO;
334   3                NO(0),NO(NONBR-1)=80H;
335   3                N2(N2NBR-1)=TFX(L);
336   3                N3(N2NBR-1)=TFY(L);
337   3              END;
338   2              S=0;
339   2              DO I=0 TO N1NBR-2;
340   3                SCR=0;
341   3                DO WHILE (SCRP:=ABS8(N1(I)))>PLATVAL AND I<N1NBR;
342   4                  IF SCRP>SCR THEN DO;
```

```
344   5                SCR=SCRP;
345   5                IMAX=I;
346   5                R=0;
347   5              END;
348   4            IF SCRP=SCR THEN R=R+1;
350   4            I=I+1;
351   4            T=T+1;
```

PL/M-86 COMPILER    SEGMENTATION

```
352   4          END;
353   3          IF T>PLATLARG OR SCR>PICVAL THEN DO;
355   4              J=IMAX+SHR(R,1);
356   4              NO(J)=80H;
357   4              S=S+1;
358   4              I=I+MINSG;
359   4          END;
360   3        END;
361   2      IF S<2 AND FERME THEN DO;
363   3        IF S=0 THEN DO;
365   4          T=0;
366   4          DO I=0 TO N1NBR-1;
367   5            IF ABSB(N1(I))>T THEN DO;
369   6              T=ABSB(N1(I));
370   6              J=I;
371   6            END;
372   5          END;
373   4          NO(J)=80H;
374   4        END;
375   3        T=0;
376   3        DO I=MOITIE TO N1NBR-1;
377   4          IF ABSB(N1(I))>T AND DIFW(J,I)>=MINSG THEN DO;
379   5            T=ABSB(N1(I));
380   5            LL=I;
381   5          END;
382   4        END;
383   3        NO(LL)=80H;
384   3      END;
385   2      CORRI=FAUX;
386   2      I=0;
387   2      DO WHILE I<NONBR-1;
388   3        J=I;
389   3        IF NO(I)<>81H THEN
390   3          IF ERMAX(@I)>ECARSEUIL THEN DO;
392   4            CORRI=VRAI;
393   4            NO(ANGSEC)=80H;
394   4          END;
395   3          ELSE NO(J)=81H;
396   3        ELSE DO WHILE NO(I)<>80H AND I<NONBR-1;
397   4          I=I+1;
398   4        END;
399   3      END;
400   2      IF CORRI THEN GOTO RECH;

/* segmentation */
402   2    S=0;
403   2    DO I=0 TO NONBR-1;
404   3      IF NO(I)=81H THEN DO;
406   4        PIC(S)=I;
407   4        PICX(S)=N2(I);
408   4        PICY(S)=N3(I);
409   4        S=S+1;
410   4      END;
411   3    END;
412   2    IF S+SUPLSG+2>segreleve THEN RETURN 3;
414   2    PIC(S)=NONBR;
415   2    IF FERME THEN DO;
```

PL/M-86 COMPILER    SEGMENTATION

```
417   3      PICX(S)=PICX(0);
418   3      PICY(S)=PICY(0);
419   3    END;
420   2    ELSE DO;
421   3      PICX(S)=TFX(L);
422   3      PICY(S)=TFY(L);
423   3    END;
424   2    NBRPIC=S;
425   2    DO S=0 TO NBRPIC-1;
```

```
426   3              SGORI(S)=XYABS(PICX(S),PICY(S),PICX(S+1),PICY(S+1));
427   3              XCOR=DIFW(PICX(S+1),PICX(S));
428   3              YCOR=DIFW(PICY(S+1),PICY(S));
429   3              IF (I:=MODUL(XCOR,YCOR))=0FFFFH THEN RETURN 2;
431   3              SGLGR(S)=I;
432   3           END;

/* éliminer des segments superflus */
433   2           DO T=0 TO NBRPIC-3;
434   3              ALP1=TANGENT(PICX(T),PICY(T),PICX(T+2),PICY(T+2));
435   3              IF SGORI(T)<ECARSEUIL THEN DO;
437   4                 SGLGR(T)=MODUL(DIFW(PICX(T),PICX(T+2)),DIFW(PICY(T),PICY(T+2)));
438   4                 SGORI(T)=ALP1;
439   4                 SGLGR(T+1)=0;
440   4                 T=T+1;
441   4              END;
442   3           END;
443   2           S=0;
444   2           DO T=1 TO NBRPIC-2;
445   3              IF SGLGR(T)=0 THEN DO;
447   4                 CALL MOVB(@SGORI(T+1),@SGORI(T),NBRPIC-T);
448   4                 CALL MOVW(@SGLGR(T+1),@SGLGR(T),NBRPIC-T);
449   4                 CALL MOVW(@PIC(T+1),@PIC(T),NBRPIC-T);
450   4                 CALL MOVW(@PICX(T+1),@PICX(T),NBRPIC-T);
451   4                 CALL MOVW(@PICY(T+1),@PICY(T),NBRPIC-T);
452   4                 S=S+1;
453   4              END;
454   3           END;
455   2           PSEG=NBRPIC-S;
456   2           PFSG=PSEG+PDSG-1;
457   2           EXTSG=PSEG+SUPLSG;

458   2           ISEG=PFSG+1;
459   2           IF PTPRIS THEN DO S=0 TO PSEG-1;
461   3              IF IPRIS1>=PIC(S) AND IPRIS1<PIC(S+1) THEN DO;
463   4                 IP(0)=(S+PSEG-3) MOD PSEG;
464   4                 IL(0)=MODUL(DIFW(PICX(S),N2(IPRIS1)),DIFW(PICY(S),N3(IPRIS1)));
465   4              END;
466   3              IF IPRIS2>=PIC(S) AND IPRIS2<PIC(S+1) THEN DO;
468   4                 IP(1)=(S+PSEG-3) MOD PSEG;
469   4                 IL(1)=MODUL(DIFW(PICX(S),N2(IPRIS2)),DIFW(PICY(S),N3(IPRIS2)));
470   4              END;
471   3           END;
472   2           IF FERME THEN DO;
474   3              CALL MOVB(@SGORI(0),@SGORI(PSEG),SUPLSG);
475   3              CALL MOVW(@SGLGR(0),@SGLGR(PSEG),SUPLSG);
476   3              CALL MOVW(@PICX(0),@PICX(PSEG),SUPLSG);
477   3              CALL MOVW(@PICY(0),@PICY(PSEG),SUPLSG);
```

PL/M-86 COMPILER       SEGMENTATION

```
478   3              END;
479   2           ELSE DO;
480   3              CALL MOVRB(@SGORI(0),@SGORI(8),PSEG);
481   3              CALL MOVRW(@SGLGR(0),@SGLGR(8),PSEG);
482   3              CALL SETB(SGORI(PDSG),@SGORI(0),PDSG);
483   3              CALL SETB(SGORI(PFSG),@SGORI(ISEG),PDSG);
484   3              CALL SETW(0,@SGLGR(0),PDSG);
485   3              CALL SETW(0,@SGLGR(ISEG),PDSG);
486   3              CALL MOVRW(@PICX(0),@PICX(PDSG),PSEG+1);
487   3              CALL MOVRW(@PICY(0),@PICY(PDSG),PSEG+1);
488   3              IF PDSG>0 THEN DO;
                        /* ceci est pour les operations "XOR" dans PTSETAT(X,Y) */
490   4                 IF PICX(1)<PICX(0) THEN PICX(PDSG-1)=PICX(0)+1;
492   4                 ELSE IF PICX(0)>0 THEN PICX(PDSG-1)=PICX(0)-1;
494   4                 IF PICY(1)<PICY(0) THEN PICY(PDSG-1)=PICY(0)+1;
496   4                 ELSE IF PICY(0)>0 THEN PICY(PDSG-1)=PICY(0)-1;
498   4              END;
499   3           END;

500   2           DO S=1 TO EXTSG-1;
501   3              SGANG(S)=SGORI(S)-SGORI(S-1);
502   3           END;
503   2           PPERI=0;
504   2           DO S=PDSG TO PFSG;
505   3              PETSG(S)=(SGLGR(S)<SEGSL);
506   3              PPERI=PPERI+SGLGR(S);
507   3           END;
```

```
                            /* calculer des segments plus significatifs */
508    2                    CALL SETB(0,@PLSG(0),lsgnbr);
509    2                    SGLGR(segreleve-1)=SEGSL;
510    2                    IF FERME THEN IDX=PDSG; ELSE IDX=PDSG+1;
513    2                    DO T=IDX TO PFSG;
514    3                        IF SGLGR(T)>SGLGR(PLSG(lsgnbr-1)) THEN DO;
516    4                            S=lsgnbr-2;
517    4                            DO WHILE S<>OFFH AND SGLGR(T)>SGLGR(PLSG(S));
518    5                                S=S-1;
519    5                            END;
520    4                            S=S+1;
521    4                            IF S<lsgnbr-1 THEN CALL MOVRB(@PLSG(S),@PLSG(S+1),lsgnbr-S-1);
523    4                            PLSG(S)=T;
524    4                        END;
525    3                    END;
526    2                    T=0;
527    2                    DO WHILE SGLGR(PLSG(T))>SEGSL;
528    3                        T=T+1;
529    3                    END;
530    2                    CALL SETB(OFFH,@NO(0),EXTSG);
531    2                    NLSG=T;
532    2                    S,T=0;
533    2                    DO WHILE T<NLSG AND S<ssgnbr;
534    3                        TMP1=PLSG(T);
535    3                        TMP2=TMP1+1;
536    3                        AV=(SGANG(TMP1)<80H AND SGANG(TMP1)>ANGSGNF AND NO(TMP1));
537    3                        AR=(SGANG(TMP2)<80H AND SGANG(TMP2)>ANGSGNF AND NO(TMP2));
538    3                        IF AV AND AR THEN DO;
540    4                            IF (R:=TMP2)>PFSG THEN R=PDSG;
```

PL/M-86 COMPILER    SEGMENTATION

```
542    4                            IF SGLGR(TMP2)>SGLGR(TMP1-1) THEN DO;
544    5                                PSSG(S)=R;
545    5                                PSSG(S+1)=TMP1;
546    5                            END;
547    4                            ELSE DO;
548    5                                PSSG(S)=TMP1;
549    5                                PSSG(S+1)=R;
550    5                            END;
551    4                            NO(TMP1),NO(TMP2)=FAUX;
552    4                            S=S+2;
553    4                        END;
554    3                        ELSE IF AV THEN DO;
556    4                            PSSG(S)=TMP1;
557    4                            NO(TMP1)=FAUX;
558    4                            S=S+1;
559    4                        END;
560    3                        ELSE IF AR THEN DO;
562    4                            IF TMP2>PFSG THEN PSSG(S)=PDSG;
564    4                            ELSE PSSG(S)=TMP2;
565    4                            NO(TMP2)=FAUX;
566    4                            S=S+1;
567    4                        END;
568    3                        T=T+1;
569    3                    END;
570    2                    NSSG=S;

571    2                    IF NSSG<3 THEN RETURN 4;
573    2                    DO S=0 TO NSSG-1;
574    3                        IDX=PSSG(S);
575    3                        IDAV=PSSG(S)-1;
576    3                        IF SGLGR(IDAV)>SGLGR(IDX) THEN
577    3                            IF SHR(SGLGR(IDAV),1)>SGLGR(IDX) THEN PSGTYP(S)=2;
579    3                            ELSE PSGTYP(S)=0;
580    3                        ELSE IF SHR(SGLGR(IDX),1)>SGLGR(IDAV) THEN PSGTYP(S)=3;
582    3                        ELSE PSGTYP(S)=1;
583    3                    END;
584    2                    RETURN 0;
585    2                END SEGMENT;

586    1                DEVIAT: PROC(IPC,I,JPC) WORD;
587    2                    DCL (ALPA,ALPB,ALP) BYTE;
588    2                    DCL (IPC,I,JPC,A,B,XD,YD,XM,YM,XF,YF) WORD;
589    2                    XD=N2(IPC);
590    2                    YD=N3(IPC);
591    2                    XF=N2(JPC);
592    2                    YF=N3(JPC);
593    2                    XM=N2(I);
594    2                    YM=N3(I);
```

```
595  2       ALP=XYREL(XD,YD,XF,YF);
596  2       A=I-IPC;
597  2       B=JPC-I;
598  2       IF A<B THEN RETURN A*ECARN(ABSB(XYABS(XD,YD,XM,YM)-ALP));
600  2       ELSE RETURN B*ECARN(ABSB(XYABS(XM,YM,XF,YF)-ALP));
601  2       END DEVIAT;

602  1    ERMAX: PROC(PIPC) WORD;
603  2       DCL T BYTE;
```

PL/M-86 COMPILER    SEGMENTATION

```
604  2       DCL PIPC PTR;
605  2       DCL IPC BASED PIPC WORD;
606  2       DCL (JPC,I,ECAR,ECARMX) WORD;
607  2       DCL BF(10) BYTE;
608  2       JPC=IPC+1;
609  2       DO WHILE NO(JPC)<80H OR NO(JPC)>81H;
610  3          JPC=JPC+1;
611  3       END;
612  2       IF IPC+MINSG>JPC THEN DO;
614  3          IPC=JPC;
615  3          RETURN 0;
616  3       END;
617  2       ECARMX=0;
618  2       DO I=IPC+MOITIE TO JPC-MOITIE BY 3;
619  3          IF (ECAR:=DEVIAT(IPC,I,JPC))>ECARMX THEN DO;
621  4             ECARMX=ECAR;
622  4             ANGSEC=I;
623  4          END;
624  3       END;
625  2       IF ECARMX>ECARSEUIL THEN
626  2          IF DEVIAT(IPC,ANGSEC-1,JPC)>ECARMX THEN ANGSEC=ANGSEC-1;
628  2          ELSE IF DEVIAT(IPC,ANGSEC+1,JPC)>ECARMX THEN ANGSEC=ANGSEC+1;
630  2       IPC=JPC;
631  2       RETURN ECARMX;
632  2       END ERMAX;

633  1    END SEGMENTATION;
```

MODULE INFORMATION:

```
    CODE AREA SIZE     = 16FAH    5882D
    CONSTANT AREA SIZE = 025AH     602D
    VARIABLE AREA SIZE = 36B6H   14006D
    MAXIMUM STACK SIZE = 0020H      32D
    716 LINES READ
    0 PROGRAM WARNINGS
    0 PROGRAM ERRORS
```

DICTIONARY SUMMARY:

```
    25KB MEMORY AVAILABLE
    14KB MEMORY USED    (57%)
    0KB DISK SPACE USED
```

END OF PL/M-86 COMPILATION

PL/M-86 COMPILER    GESTIONDICO

SERIES-III PL/M-86 V2.7 COMPILATION OF MODULE GESTIONDICO
OBJECT MODULE PLACED IN :F2:VXDICO.OBJ
COMPILER INVOKED BY: PLM86.86 :F2:VXDICO.SRC DEBUG

```
            $LARGE
    1       GESTION$DICO: DO;
            $NOLIST INCLUDE(:F1:PLMLIB.SRC)
            $NOLIST INCLUDE(:F2:SOFPUB.LIT)
            $NOLIST INCLUDE(:F2:VXUTIL.EXT)
            $NOLIST INCLUDE(:F2:VXIDEN.EXT)
            $NOLIST INCLUDE(:F2:VXSEGM.EXT)

131  1    DCL OBJ(objnbr) STRUC (
                  NOM(nomlgr) BYTE,
                  (A,
                  D)(segindic) BYTE,
```

```
                    Z(segindic) WORD,
                    (VTNBR,
                    SEG,
                    IP1,
                    IP2) BYTE, (AGL,
                    PERIM,
                    PERISL,

IL1,
                    IL2)

WORD) PUBLIC;

132   1     DCL IOM BYTE PUBLIC;

133   1     DCL VT(ttlvt) STRUC (
                    (IDX,
                    ORI1,
                    ORI2,
                    TYP) BYTE,
                    (I,
                    A1,
                    A2)(vtses) BYTE,
                    L(vtses)
                WORD) PUBLIC;

134   1     DCL OBJORD(objnbr) BYTE PUBLIC;

PL/M-86 COMPILER    GESTIONDICO 135   1     DCL (VTSIZE,PERI_SEUIL,REC_TOLER) WORD PUBLIC;
136   1     DCL (XPIXNB,YPIXNB) WORD PUBLIC;

137   1     DIFW: PROC(A,B) WORD;
138   2       DCL (A,B) WORD;
139   2       IF A>B THEN RETURN A-B;
141   2       ELSE RETURN B-A;
142   2     END DIFW;

143   1     CALVT: PROC(V);
144   2       DCL (V,IDX,IDAV,T,S) BYTE;
145   2       DCL (I,I1,I2,X0,Y0) WORD;
146   2       DCL AAA(vtses) WORD;
147   2       DCL LLL(vtses) WORD;
148   2       DCL SSS(vtses) BYTE;
149   2       IDX=VT(V).IDX+PDSG;
150   2       IDAV=IDX-1;
151   2       VT(V).ORI1=SGORI(IDX);
152   2       VT(V).ORI2=SGORI(IDAV);
153   2       X0=PICX(IDX);
154   2       Y0=PICY(IDY);
155   2       CALL SETW(0,@AAA(0),vtses);
156   2       DO I1=IDX+1 TO IDX+PSEG-1;
157   3         T=((I1-PDSG) MOD PSEG)+PDSG;
158   3         IF SGANG(T)<80H THEN DO;
160   4           I=MODUL(DIFW(X0,PICX(T)),DIFW(Y0,PICY(T)));
161   4           IF I>VTSIZE THEN DO;
163   5             S=vtses-1;
164   5             I2=I*SGANG(T);
165   5             DO WHILE S<>0FFH AND I2>AAA(S);
166   6               S=S-1;
167   6             END;
168   5             S=S+1;
169   5             IF S<vtses THEN DO;
171   6               CALL MOVRW(@AAA(S),@AAA(S+1),vtses-S-1);
172   6               CALL MOVRW(@LLL(S),@LLL(S+1),vtses-S-1);
173   6               CALL MOVRB(@SSS(S),@SSS(S+1),vtses-S-1);
174   6               AAA(S)=I2;
175   6               LLL(S)=I;
176   6               SSS(S)=T;
177   6             END;
178   5           END;
179   4         END;
180   3       END;
181   2       S=0;
182   2       DO WHILE AAA(S)>0 AND S<vtses-1;
183   3         VT(V).I(S)=SSS(S)-PDSG;
184   3         T=TANGENT(X0,Y0,PICX(SSS(S)),PICY(SSS(S)));
185   3         VT(V).A1(S)=T-VT(V).ORI1;
```

```
186   3          VT(V).A2(S)=T-VT(V).ORI2;
187   3          VT(V).L(S)=LLL(S);
188   3          S=S+1;
189   3         END;
190   2        VT(V).L(S)=0;
191   2       END CALVT;

/****************************************************************
             ****************************************************************

192   1       RECORD: PROC(PNOM) BYTE PUBLIC;
193   2        DCL (S,T,OBJANA,RETVAL) BYTE;
194   2        DCL PNOM PTR;
195   2        IF NOT FERME THEN RETURN 1;
197   2        RETVAL=DELOBJ(PNOM) AND 2;
198   2        IF IOM>=objnbr THEN RETURN 3;
200   2        OBJANA=0;
201   2        DO WHILE FINDB(@OBJORD(0),OBJANA,IOM)<>0FFFFH;
202   3           OBJANA=OBJANA+1;
203   3          END;
204   2        S=0;
205   2        DO WHILE S<IOM AND PPERI<OBJ(OBJORD(S)).PERIM;
206   3           S=S+1;
207   3          END;
208   2        IF S<IOM THEN CALL MOVRB(@OBJORD(S),@OBJORD(S+1),IOM-S);
210   2        OBJORD(S)=OBJANA;

PL/M-86 COMPILER    GESTIONDICO 211   2        CALL MOVB(PNOM,@OBJ(OBJANA).NOM(0),noalsr);
212   2        IOM=IOM+1;
213   2        IF (NSSG>vtparobj) THEN OBJ(OBJANA).VTNBR=vtparobj;
215   2        ELSE OBJ(OBJANA).VTNBR=NSSG;
216   2        DO T=0 TO OBJ(OBJANA).VTNBR-1;
217   3           S=vtparobj*OBJANA+T;
218   3           VT(S).IDX=PSSG(T)-PDSG;
219   3           VT(S).TYP=PSGTYP(T);
220   3           CALL CALVT(S);
221   3          END;
222   2        CALL MOVB(@SGANG(PDSG),@OBJ(OBJANA).A(0),PSEG);
223   2        CALL MOVB(@SGORI(PDSG),@OBJ(OBJANA).D(0),PSEG);
224   2        CALL MOVW(@SGLGR(PDSG),@OBJ(OBJANA).Z(0),PSEG);
225   2        CALL MOVB(@SGANG(PDSG),@OBJ(OBJANA).A(PSEG),PSEG);
226   2        CALL MOVB(@SGORI(PDSG),@OBJ(OBJANA).D(PSEG),PSEG);
227   2        CALL MOVW(@SGLGR(PDSG),@OBJ(OBJANA).Z(PSEG),PSEG);
228   2        OBJ(OBJANA).A(SHL(PSEG,1))=OBJ(OBJANA).A(0);
229   2        OBJ(OBJANA).D(SHL(PSEG,1))=OBJ(OBJANA).D(0);
230   2        OBJ(OBJANA).Z(SHL(PSEG,1))=OBJ(OBJANA).Z(0);
231   2        IF PTPRIS THEN DO;
233   3           OBJ(OBJANA).IP1=IP(0);
234   3           OBJ(OBJANA).IP2=IP(1);
235   3           OBJ(OBJANA).IL1=IL(0);
236   3           OBJ(OBJANA).IL2=IL(1);
237   3          END;
238   2        ELSE OBJ(OBJANA).IP1=0FFH;
239   2        OBJ(OBJANA).PERIM=PPERI;
240   2        OBJ(OBJANA).PERISL=SHR(PERI_SEUIL*PPERI+8,4);
241   2        IF OBJ(OBJANA).PERISL<64 THEN
242   2           OBJ(OBJANA).PERISL=OBJ(OBJANA).PERISL+SHR(64-OBJ(OBJANA).PERISL,2);
243   2        OBJ(OBJANA).SEG=PSEG;
244   2        RETURN RETVAL;
245   2       END RECORD;

246   1       CHRDICO: PROC(ADRS) BYTE PUBLIC;
247   2        DCL ADRS PTR;
248   2        DCL NOM_OBJ BASED ADRS(1) BYTE;
249   2        DCL T BYTE;
250   2        T=0;
251   2        DO WHILE T<IOM AND CMPB(@OBJ(OBJORD(T)).NOM(0),@NOM_OBJ(0),noalsr)<>0FFFFH;
252   3           T=T+1;
253   3          END;
254   2        IF T<IOM THEN RETURN OBJORD(T);
256   2        ELSE RETURN 0FFH;
257   2       END CHRDICO;

258   1       DELOBJ: PROC(ADRS) BYTE PUBLIC;
259   2        DCL ADRS PTR;
260   2        DCL (OBJANA,H) BYTE;
261   2        IF (OBJANA:=CHRDICO(ADRS))=0FFH THEN RETURN FAUX;
263   2        H=LOW(FINDB(@OBJORD(0),OBJANA,IOM));
```

```
264    2         CALL MOVB(@OBJORD(H+1),@OBJORD(H),IOM-H-1);
265    2         IOM=IOM-1;
266    2         RETURN VRAI;
267    2         END;

268    1    INITSOFIA: PROC PUBLIC;

PL/M-86 COMPILER    GESTIONDICO 269    2         DCL T BYTE;

/* Initialisation du Dictionnaire */
270    2              IOM=0;

/* Initialisation des Parametres pour CONTOURX
                    CONTOURTROUVE,FERME=FAUX;
                    SEUILMIN=30;
                    SEUIL=23;
                    LIMMIN=32;
                    NIVMINDEC=11;

init avant CHRCX, reservee */

/* Initialisation des Parametres pour SEGMENT */
271    2              BORD=12;
272    2              ANGSGNF=16;                            /* resol. dependant */
273    2              SEGSL=18;
274    2              MINSG=12;                              /* resol. dependant */
275    2              MOITIE=SHR(MINSG+1,1);                 /* resol. dependant */
276    2              PICVAL=20;                             /* resol. dependant */
277    2              PLATVAL=10;
278    2              PLATLARG=4;
279    2              ECARSEUIL=350;                         /* resol. dependant */
                                                             /* resol. dependant */
                 /* Initialisation des Parametres pour RECORD */
                    /* PERI_SEUIL est deja initilise dans PARAM */
280    2              VTSIZE=20;                             /* resol. dependant */

/* Initialisation des Parametres pour IDENT */
281    2              DEPASS=12;                             /* resol. dependant */
282    2              REC_ECART=13;                          /* resol. dependant, deduit de */
                                                             /*   ECARN(*) et de DEPASS     */
283    2              REC_TOLER=1;
284    2              NEGLIGE_PERIM=40;
285    2              PERI_SEUIL=7;                          /* PERI_SEUIL=7 valeur sur 16 */
286    2         CALL PARAM;

287    2              VTF_TOLER=6;                           /* resol. dependant */
288    2              AJU_TOLER=6;                           /* resol. dependant */
289    2              BRU_VERI_TOLER=7;                      /* resol. dependant */
290    2              MIN_VALUEPT=3;
291    2              MIN_SG_ID=3;
292    2              SUPERIM=4;                             /* valeur sur 16 */
293    2              SEG_BOUT=7;                            /* resol. dependant */
294    2              VTEXM=vtparobj;
295    2              VTSGEXM=vtseg;

/* Initialisation des Tableaux Concernes par le Rapport de Pixel */
296    2              XPIXNB=25;
297    2              YPIXNB=38;
298    2         CALL DEFINTBL;                              /* init a 1.48 pour VX200 */

299    2    END INITSOFIA;

300    1    PARAM: PROC PUBLIC;

PL/M-86 COMPILER    GESTIONDICO 301    2         DCL T WORD;

/* Modification des Parametres pour IDENT */
302    2    IF IOM>0 AND IOM<10 THEN DO T=0 TO IOM-1;
304    3         OBJ(T).PERISL=SHR(PERI_SEUIL*OBJ(T).PERIM+8,4);
305    3         IF OBJ(T).PERISL<64 THEN
306    3              OBJ(T).PERISL=OBJ(T).PERISL+SHR(64-OBJ(T).PERISL,2);
307    3    END;
```

```
308    2        IF REC_TOLER THEN DO;
310    3            FIN_VERI_TOLER=5;              /* resol. dependant */
311    3            SML_ORIECAR=18;
312    3            GRT_ORIECAR=32;
313    3            NEGL_SGLGR=16;                 /* resol. dependant */
314    3            REC_GRD_SEUIL=6;
315    3            GRT_AJUECAR=12;
316    3            SML_AJUECAR=6;
317    3        END;
318    2        ELSE DO;
319    3            FIN_VERI_TOLER=4;              /* resol. dependant */
320    3            SML_ORIECAR=14;
321    3            GRT_ORIECAR=28;
322    3            NEGL_SGLGR=12;                 /* resol. dependant */
323    3            REC_GRD_SEUIL=8;
324    3            GRT_AJUECAR=10;
325    3            SML_AJUECAR=5;
326    3        END;
327    2    END PARAM;

328    1    DEFINTBL: PROC PUBLIC;
329    2        DCL T BYTE;
330    2        DCL IDC WORD;
331    2        DCL (VARDW,YSURX,IDCDW) DWORD;
332    2        DCL WCOS(65) WORD DATA(
                    65535,65516,65457,65358,65220,65043,64827,64571,64277,63944,63572,63162,
                    62714,62228,61705,61145,60547,59914,59244,58538,57798,57022,56212,55368,
                    54491,53581,52639,51665,50660,49624,48559,47464,46341,45190,44011,42806,
                    41576,40320,39040,37736,36410,35062,33692,32303,30893,29466,28020,26558,
                    25080,23586,22078,20557,19024,17479,15924,14359,12785,11204, 9616, 8022,
                     6424, 4821, 3216, 1608,    0);

333    2        DCL WTAN(45) WORD DATA(
                      402, 1207, 2013, 2822, 3634, 4450, 5272, 6101, 6937, 7782, 8637, 9503,
                    10381,11273,12180,13104,14046,15009,15993,17001,18035,19098,20191,21318,
                    22481,23685,24931,26226,27572,28975,30440,31973,33582,35274,37058,38943,
                    40942,43068,45335,47761,50368,53179,56223,59536,63157);

334    2        YSURX=(SHL(DOUBLE(YPIXNB),15)+SHR(XPIXNB,1))/XPIXNB;

/* Definition du tableau XCAR */
335    2        IDC=0;
336    2        VARDW=0;
337    2        DO WHILE VARDW<32768;
338    3            XCAR(IDC)=VARDW;
339    3            IDC=IDC+1;
340    3            IDCDW=DOUBLE(IDC);

PL/M-86 COMPILER    GESTIONDICO 341    3            VARDW=SHR(IDCDW*IDCDW+SHR(YSURX*YSURX+8000H,16)+2000H,14);
342    3        END;
343    2        XTBLCARRE=LOW(IDC);

/* Definition du tableau COSX */
344    2        DO IDC=0 TO 64;
345    3            COSX(IDC)=(SHL(DOUBLE(WCOS(IDC)),6)+SHR(YSURX,1))/YSURX;
346    3        END;

/* Definition des tableaux ATNX et ATNY */
347    2        DO IDC=0 TO 255;
348    3            IDCDW=DOUBLE(IDC);
349    3            VARDW=(SHL(IDCDW,22)+SHR(YSURX,1))/YSURX;
350    3            T=0;
351    3            DO WHILE VARDW>WTAN(T) AND T<45;
352    4                T=T+1;
353    4            END;
354    3            ATNY(IDC)=T;

355    3            VARDW=SHR(IDCDW*YSURX+80H,8);
356    3            T=0;
357    3            DO WHILE VARDW>WTAN(T) AND T<45;
358    4                T=T+1;
359    4            END;
360    3            ATNX(IDC)=64-T;
361    3        END;
362    2    END DEFINTBL;

363    1    END GESTION$DICO;
```

MODULE INFORMATION:

CODE AREA SIZE     = 08E6H    3046D
    CONSTANT AREA SIZE = 019CH     412D
    VARIABLE AREA SIZE = 2B7AH   11130D
    MAXIMUM STACK SIZE = 001AH      26D
    567 LINES READ
    0 PROGRAM WARNINGS
    0 PROGRAM ERRORS

DICTIONARY SUMMARY:

25KB MEMORY AVAILABLE
    14KB MEMORY USED   (57%)
    0KB DISK SPACE USED

END OF PL/M-86 COMPILATION

PL/M-86 COMPILER    TB_SPO

SERIES-III PL/M-86 V2.7 COMPILATION OF MODULE TB_SPO
OBJECT MODULE PLACED IN :F2:VXRAM.OBJ
COMPILER INVOKED BY:  PLM86.86 :F2:VXRAM.SRC DEBUG

```
                    $LARGE
                    $ROM
        1           TB_SPO:DO;
                    /********************************************************
                    * 3-NOME:
                    * 4-ENV :
                    * 5-BUT :
                    *       :
                    * 6-CALL:
                    * 7-REM :
                    * 8-VAR :
                    * 9-I/O :
                    *10-ERR :
                    *11-USE :
                    *12-APP :
                    *13-ALG :
                    *14-REF :
                    *15-PROG:
                    *16-MOD : 24.09.86
                    ********************************************************/

2   1           DECLARE NB_FCT_SO       BYTE EXTERNAL;

3   1           DECLARE TB_FCT_SO(8)    STRUCTURE (
                            ADR             POINTER,
                            LGC             BYTE    ,
                            NOM(8)          BYTE    ,
                            CF              WORD    ,
                            NPA             BYTE    ,
                            NPR             BYTE    ,
                            TPA             DWORD   )

EXTERNAL;

4   1           DECLARE ENTETE_FCT STRUCTURE (
                            IDENT(8)        BYTE,
                            PT_NB           POINTER,
                            PT_TB           POINTER)
                        AT (040000H)
                        DATA(
                            'FCT SPEC',
                            @NB_FCT_SO,
                            @TB_FCT_SO);

5   1           END TB_SPO;

PL/M-86 COMPILER    TB_SPO

MODULE INFORMATION:

CODE AREA SIZE     = 0000H      0D
    CONSTANT AREA SIZE = 0000H      0D
```

```
        VARIABLE AREA SIZE = 0000H        0D
        MAXIMUM STACK SIZE = 0000H        0D
        48 LINES READ
        0 PROGRAM WARNINGS
        0 PROGRAM ERRORS

DICTIONARY SUMMARY:

25KB MEMORY AVAILABLE
    4KB MEMORY USED    (16%)
    0KB DISK SPACE USED

END OF PL/M-86 COMPILATION

PL/M-86 COMPILER    SUPS00

SERIES-III PL/M-86 V2.7 COMPILATION OF MODULE SUPS00
OBJECT MODULE PLACED IN :F2:VXSOF0.OBJ
COMPILER INVOKED BY:  PLM86.86 :F2:VXSOF0.SRC DEBUG $NOLIST INCLUDE(:F2:VXREF.DEF)
    1           SUPS00:DO;
                $NOLIST INCLUDE(:F1:PLMLIB.SRC)
                $NOLIST INCLUDE(:F2:SOFPUB.LIT)
                $NOLIST INCLUDE(:F2:VXSEGM.EXT)
                $NOLIST INCLUDE(:F2:VXDICO.EXT)
                $NOLIST INCLUDE(:F2:VXIDEN.EXT)
                $NOLIST INCLUDE(:F2:VXUTIL.EXT)
                $NOLIST INCLUDE(:F2:VXERR.LIT)

/*****************************************************
                * 3-NOMF:  :F2:SUPS00.PLM
                * 4-ENV :
                * 5-BUT :   macros vision de la classe sofis
                * 6-CALL:
                * 7-REM :
                * 8-VAR :
                * 9-I/O :
                *10-ERR :
                *11-USE :
                *12-APP :
                *13-ALG :
                *14-REF :
                *15-PROG: S.Tan
                *16-MOD : V.-03- 26.09.86
                *****************************************************
```

PL/M-86 COMPILER    SUPS00

```
        * - SEGMT   |                          | < CODE D'ERREURS
        +-----------+--------------------------+------------------
        * - RECORD  | > NOM (16 CARACTERES )   |
        +-----------+--------------------------+------------------
        * - IDENT   |                          | < NB. D'OBJETS RECONNUS
        +-----------+--------------------------+------------------
        * - DICLST  |                          |
        +-----------+--------------------------+------------------
        * - DELOBJ  | > NOM (16 CARACTERES )   |
        *****************************************************

$EJECT
184  1  DECLARE NB_FCT_S0           BYTE PUBLIC DATA(8);
185  1  DECLARE TB_FCT_S0(8) STRUCTURE (
                    ADR          POINTER,    /* Adresse procedure    */
                    LGC          BYTE   ,    /* Lg du nom            */
                    NOM(8)       BYTE   ,    /* Intitule             */
                    CF           WORD   ,    /* Code fonction        */
                    NPA          BYTE   ,    /* Nb de par d'appel    */
                    NPR          BYTE   ,    /* Nb de par de retour  */
                    TPA          DWORD  )    /* Type des parametres  */
                                             /* 00 RIEN              */
                                             /* 01 WORD              */
                                             /* 10 REEL              */
                                             /* 11 ASCII 16          */
                                   PUBLIC DATA (
            @PL_INITS0 ,6,'INITS0  ',0000 ,00,0,00$00$00$00$00$00$00$00$00);
```

```
 @P_PARAM    ,5,'PARAM    ',0001      ,03,0,01$01$01$00$00$00$00$00$00$00$00$00
 @P_PIXFRM   ,6,'PIXFRM   ',0002      ,02,0,01$01$00$00$00$00$00$00$00$00$00$00
 @P_SEGMT    ,5,'SEGMT    ',0003      ,00,0,00$00$00$00$00$00$00$00$00$00$00$00
 @P_RECORD   ,6,'RECORD   ',0004      ,01,0,11$00$00$00$00$00$00$00$00$00$00$00
 @P_IDENT    ,5,'IDENT    ',0005      ,00,9,01$01$01$01$01$01$01$01$00$00$00$00
 @P_DICLST   ,6,'DICLST   ',0006      ,00,0,00$00$00$00$00$00$00$00$00$00$00$00
 @P_DELOBJ   ,6,'DELOBJ   ',0007      ,01,0,11$00$00$00$00$00$00$00$00$00$00$00
 );
```

$EJECT

PL/M-86 COMPILER    SUPS00

```
186  1     DECLARE ZONE_APPEL LITERALLY
           'AP BASED    PT_AP STRUCTURE(RESERVE WORD,/*mat*/
                                       ADE     WORD,/*mat*/
                                       ADR     WORD,/*mat*/
                                       LG      WORD,/*longueur de la zone*/
                                       CF      WORD,/*code fonction*/
                                       PAR(1)  WORD)/*parametres appel*/';

187  1     DECLARE ZONE_RETOUR LITERALLY
           'RT BASED    PT_RT STRUCTURE(RESERVE WORD,/*mat*/
                                       ADE     WORD,/*mat*/
                                       ADR     WORD,/*mat*/
                                       LG      WORD,/*longueur de la zone*/
                                       CF      WORD,/*code fonction*/
                                       CE      WORD,/*code erreur*/
                                       PAR(1)  WORD)/*parametres retour*/';
```

$EJECT

PL/M-86 COMPILER    SUPS00

```
/***************************************************************
/*
/*                      INITSO
/*
/***************************************************************
188  1     P_INITSO: PROCEDURE(PT_AP,PT_RT) PUBLIC;

189  2         DECLARE PT_AP POINTER
190  2         DECLARE PT_RT POINTER
191  2         DECLARE ZONE_APPEL
192  2         DECLARE ZONE_RETOUR 193  2         RT.CF=AP.CF;
194  2         RT.LG=3     ;
195  2         RT.CE=0     ;
196  2         CALL INITSOFIA;

197  2     END P_INITSO;
```

$EJECT

PL/M-86 COMPILER    SUPS00

```
/***************************************************************
/*
/*                      PARAM
/*
/***************************************************************
198  1     P_PARAM: PROCEDURE(PT_AP,PT_RT) PUBLIC;

199  2         DECLARE PT_AP POINTER
200  2         DECLARE PT_RT POINTER
201  2         DECLARE ZONE_APPEL
202  2         DECLARE ZONE_RETOUR 203  2         RT.CF=AP.CF;
204  2         RT.LG=3     ;
205  2         RT.CE=0     ;
```

```
206    2        IF AP.PAR(0)<>0FFFFH THEN NEGLIGE_PERIM=AP.PAR(0);
208    2        IF AP.PAR(1)<16 THEN PERI_SEUIL=AP.PAR(1);
210    2        IF AP.PAR(2)<2 THEN  REC_TOLER=AP.PAR(2);

212    2        CALL PARAM;

213    2     END P_PARAM;

$EJECT
```

PL/M-86 COMPILER    SUPS00

```
             /****************************************************
             /*
             /*                      PIXFRM
             /*
             /****************************************************
214    1     P_PIXFRM: PROCEDURE(PT_AP,PT_RT) PUBLIC;

215    2        DECLARE PT_AP POINTER
216    2        DECLARE PT_RT POINTER
217    2        DECLARE ZONE_APPEL
218    2        DECLARE ZONE_RETOUR 219    2        RT.CF=AP.CF;
220    2        RT.LG=3    ;
221    2        RT.CE=0    ;

222    2        IF AP.PAR(0)<>0 AND AP.PAR(0)<=AP.PAR(1) AND AP.PAR(0)>=SHR(AP.PAR(1),,
223    2           THEN DO;
224    3           XPIXNB=AP.PAR(0);
225    3           YPIXNB=AP.PAR(1);
226    3           CALL DEFINTBL;
227    3           END;

228    2     END P_PIXFRM;

$EJECT
```

PL/M-86 COMPILER    SUPS00

```
             /****************************************************
             /*
             /*                      SEGMT
             /*
             /****************************************************
229    1     P_SEGMT : PROCEDURE(PT_AP,PT_RT) PUBLIC;

230    2        DECLARE PT_AP POINTER
231    2        DECLARE PT_RT POINTER
232    2        DECLARE ZONE_APPEL
233    2        DECLARE ZONE_RETOUR

/* Declarations temporaires pour info. dico */

234    2        RT.CF=AP.CF;
235    2        RT.LG=3 ;
236    2        RT.CE=OK;

237    2        L=0;
238    2        PTPRIS=APPREN;
239    2        CALL PRINT_LS1(CANAL,'S',@(2,0DH,0AH));
240    2        DO CASE SEGMENT;
241    3           CALL PRINT_LS1(CANAL,'S',@(2,'OK'));
242    3           CALL PRINT_LS1(CANAL,'S',@(17,'CODE FREEM ERREUR'));
243    3           CALL PRINT_LS1(CANAL,'S',@(17,'SEGMENT TROP LONG'));
244    3           CALL PRINT_LS1(CANAL,'S',@(16,'TROP DE SEGMENTS'));
245    3           CALL PRINT_LS1(CANAL,'S',@(20,'SEGMENTS INSUFISANTS'));
246    3           END;

247    2     END P_SEGMT ;

$EJECT
```

PL/M-86 COMPILER    SUPS00

```
/*********************************************************************
/*
/*                          RECORD
/*
/*********************************************************************
248  1    P_RECORD: PROCEDURE(PT_AP,PT_RT) PUBLIC;

249  2        DECLARE PT_AP POINTER
250  2        DECLARE PT_RT POINTER
251  2        DECLARE ZONE_APPEL
252  2        DECLARE ZONE_RETOUR 253  2        RT.CF=AP.CF;
254  2        RT.LG=3 ;
255  2        DO CASE RECORD(@AP.PAR(0));
256  3            RT.CE=OK;
257  3            RT.CE=CONTOUR_NON_FERME;
258  3            RT.CE=REMIS_A_JOUR;
259  3            RT.CE=DICTIONNAIRE_PLEIN;
260  3        END;
261  2    END P_RECORD;

$EJECT
```

PL/M-86 COMPILER    SUPS00

```
/*********************************************************************
/*
/*                          IDENT
/*
/*********************************************************************
262  1    P_IDENT : PROCEDURE(PT_AP,PT_RT) PUBLIC;

263  2        DECLARE PT_AP POINTER
264  2        DECLARE PT_RT POINTER
265  2        DECLARE ZONE_APPEL
266  2        DECLARE ZONE_RETOUR
267  2        DECLARE (OBJCLASSE,IDC1,IDC2) BYTE;

268  2        RT.CF=AP.CF;
269  2        RT.LG=4 ;
270  2        CALL IDENT;
271  2        OBJCLASSE=0;
272  2        IF OBJTROUVE=0 OR PRESOBJ(0).NUM=0FFH THEN DO;
273  3            RT.CE=OBJET_INCONNU;
274  3            RT.PAR(0)=0;
275  3        END;
276  2        ELSE DO;
277  3            IF PRESOBJ(OBJTROUVE-1).NUM=0FFH THEN DO;
278  4                RT.CE=OBJET_INCONNU;
280  4                OBJTROUVE=OBJTROUVE-1;
281  4            END;
282  3            ELSE RT.CE=OK;
283  3            RT.PAR(0)=OBJTROUVE+1;
284  3            DO IDC1=0 TO OBJTROUVE-1;
285  4                IDC2=1;
286  4                DO WHILE IDC2<=OBJCLASSE AND
287  4                         PRESOBJ(IDC1).NUM<>(RT.PAR(IDC2) AND 0FH);
288  5                    IDC2=IDC2+1;
289  5                END;
290  4                IF IDC2<=OBJCLASSE THEN RT.PAR(IDC2)=RT.PAR(IDC2)+100H;
291  4                ELSE DO;
292  5                    RT.PAR(IDC2)=DOUBLE(PRESOBJ(IDC1).NUM) OR 100H;
293  5                    OBJCLASSE=OBJCLASSE+1;
294  5                    RT.LG=RT.LG+1;
295  5                END;
296  4            END;
297  3        END;

299  2        CALL PRINT_LS1(CANAL,'S',@(2,0DH,0AH));
300  2        DO IDC2=1 TO OBJCLASSE;
301  3            CALL PRINT_LS1(CANAL,'S',@(5,0DH,0AH,'  '));
302  3            IDC1=HIGH(RT.PAR(IDC2)) AND 0FH;
303  3            CALL PRINT_LS1(CANAL,'B',@IDC1);
304  3            CALL PRINT_LS1(CANAL,'S',@(3,' X '));
```

```
305    3              CALL PRINT_LS1(CANAL,'A',@OBJ(RT.PAR(IDC2) AND OFH).NOM(0));
306    3              END;
307    2           CALL PRINT_LS1(CANAL,'S',@(2,0DH,0AH));
308    2           IF NOT FERME THEN
309    2              IF HORCADR THEN
310    2                  CALL PRINT_LS1(CANAL,'S',@(16,0DH,0AH,' ** HORS CADRE'));
311    2              ELSE CALL PRINT_LS1(CANAL,'S',@(23,0DH,0AH,' ** CONTOUR NON FERME'));
312    2           IF RT.CE<>OK THEN
```

PL/M-86 COMPILER    SUPSOO

```
313    2              CALL PRINT_LS1(CANAL,'S',@(19,0DH,0AH,' ** OBJET INCONNU'));
314    2           RT.CE=OK;
315    2        END P_IDENT ;
```

$EJECT

PL/M-86 COMPILER    SUPSOO

```
        /*******************************************************************
        /*
        /*                    DICLST
        /*
        /*******************************************************************
316    1     P_DICLST: PROCEDURE(PT_AP,PT_RT) PUBLIC;
317    2        DECLARE PT_AP POINTER
318    2        DECLARE PT_RT POINTER
319    2        DECLARE ZONE_APPEL
320    2        DECLARE ZONE_RETOUR
321    2        DECLARE COMPT BYTE 322    2        RT.CF=AP.CF;
323    2        RT.LG=3     ;
324    2        RT.CE=OK    ;
325    2        CALL PRINT_LS1(CANAL,'S',@(2,0DH,0AH));
326    2        IF IOM=0 THEN RT.CE=OBJET_N_EXISTE_PAS;
328    2        ELSE DO COMPT=0 TO IOM-1;
329    3           CALL PRINT_LS1(CANAL,'S',@(10,0DH,0AH,'        '));
330    3           CALL PRINT_LS1(CANAL,'A',@OBJ(OBJORD(COMPT)).NOM(0));
331    3        END;
332    2     END P_DICLST;
```

$EJECT

PL/M-86 COMPILER    SUPSOO

```
        /*******************************************************************
        /*
        /*                    DELOBJ
        /*
        /*******************************************************************
333    1     P_DELOBJ: PROCEDURE(PT_AP,PT_RT) PUBLIC;

334    2        DECLARE PT_AP POINTER
335    2        DECLARE PT_RT POINTER
336    2        DECLARE ZONE_APPEL
337    2        DECLARE ZONE_RETOUR 338    2        RT.CF=AP.CF;
339    2        RT.LG=3     ;
340    2        IF DELOBJ(@AP.PAR(0)) THEN RT.CE=OK;
341    2        ELSE RT.CE=OBJET_NON_DEFINI;
342    2     END P_DELOBJ;

344    1     END SUPSOO;
```

MODULE INFORMATION:

```
    CODE AREA SIZE     = 0637H    1591D
    CONSTANT AREA SIZE = 0198H     408D
    VARIABLE AREA SIZE = 0004H       4D
```

```
    MAXIMUM STACK SIZE = 0018H     240
    712 LINES READ
    0 PROGRAM WARNINGS
    0 PROGRAM ERRORS

DICTIONARY SUMMARY:

25KB MEMORY AVAILABLE
    24KB MEMORY USED   (98%)
    0KB DISK SPACE USED

END OF PL/M-86 COMPILATION

/***************************************************************
*
*          Declaration external For Module SEGME.PLM
*
*                V.-01- 25.09.86
*
****************************************************************/

DECLARE PLSG(lsgnbr) BYTE EXTERNAL;
DECLARE PSSG(ssgnbr) BYTE EXTERNAL;
DECLARE PSGTYP(ssgnbr) BYTE EXTERNAL;
DECLARE (SGANG,SGORI)(segreleve) BYTE EXTERNAL;
DECLARE SGLGR(segreleve) WORD EXTERNAL;
DECLARE (PIC,PICX,PICY)(segreleve) WORD EXTERNAL;
DECLARE PETSG(segreleve) BYTE EXTERNAL;
DECLARE (HORCADR,H_HORS,B_HORS,G_HORS,D_HORS) BYTE EXTERNAL;
DECLARE (PICVAL,PLATVAL,PLATLARG,ECARSEUIL,SEGSL,MINSG,MOITIE,
        BORD,ANGSGNF) WORD EXTERNAL;            /* seuils */
DECLARE (LEARN,PSEG,PFSG,EXTSG,NLSG,NSSG,PTPRIS) BYTE EXTERNAL;
DECLARE (BXG,BXD,BYH,BYB,PPERI) WORD EXTERNAL;
DECLARE IP(2) BYTE EXTERNAL;
DECLARE IL(2) WORD EXTERNAL;
DECLARE INFORA BYTE EXTERNAL;

DECLARE XTBLCARRE BYTE EXTERNAL;

DECLARE XCAR(tablecarre) WORD EXTERNAL;
DECLARE ATNX(256) BYTE EXTERNAL;
DECLARE ATNY(256) BYTE EXTERNAL;
DECLARE (N0,N1)(2000) BYTE EXTERNAL;

MODUL: PROCEDURE(X,Y) WORD EXTERNAL;
       DECLARE (X,Y) WORD; END MODUL;

SEGMENT: PROCEDURE BYTE EXTERNAL;
       END SEGMENT;
TANGENT: PROCEDURE(XD,YD,XF,YF) BYTE EXTERNAL;
       DECLARE (XD,XF,YD,YF) WORD; END TANGENT;

$LIST
/****************************************************************
*                                                               *
*          Declaration External For Module VXIDEN.PLM           *
*                                                               *
*                V.-01- 25.09.86                                *
*                                                               *
****************************************************************/

DECLARE PRESOBJ(rcnobj) STRUCTURE (
    (NUM,ORI,DBDC) BYTE,
    (RPERI,RSUP,X,Y,XP1,YP1,XP2,YP2) WORD) EXTERNAL;
DECLARE (SSGEXM,VTEXM,VTSGEXM) BYTE EXTERNAL;
DECLARE OBJTROUVE BYTE EXTERNAL;
DECLARE (PTI,ANGZX,EPAIX,ANGZY,EPAIY,XYSOM) BYTE EXTERNAL;
DECLARE (REC_ECART,DEPASS,NEGLIGE_PERIM,VTF_TOLER,AJU_TOLER,BRU_VERI_TOLER,
    FIN_VERI_TOLER,MIN_VALUEPT,MIN_SG_ID,SML_ORIECAR,GRT_ORIECAR,GRT_AJUECAR,
    SML_AJUECAR,SUPERIM,NEGL_SGLGR,SEG_BOUT,REC_GRD_SEUIL) WORD EXTERNAL;

DECLARE COSX(65) BYTE EXTERNAL;

PTSETAT: PROCEDURE(X,Y) BYTE EXTERNAL;
       DECLARE (X,Y) WORD; END PTSETAT;
STEPMR: PROCEDURE(ALP,PX,PY,MDL) EXTERNAL;
       DECLARE ALP BYTE;
```

```
                    DECLARE NUL WORD; END STEPBK;
IDENT: PROCEDURE EXTERNAL;
       END IDENT;

$LIST
/************************************************************************
*                                                                       *
*           Declaration External For Module GEDIC.PLM                   *
*                                                                       *
*                   V.-01- 25.09.86                                     *
*                                                                       *
************************************************************************/

DECLARE OBJ(objnbr) STRUCTURE (
    NOM(nomlsr) BYTE,
    (A,D)(sesindic) BYTE,
    Z(sesindic) WORD,
    (VTNBR,SEG,IP1,IP2) BYTE,
    (AGL,PERIM,PERISL,IL1,IL2) WORD) EXTERNAL;
DECLARE IOM BYTE EXTERNAL;
DECLARE VT(ttlvt) STRUCTURE (
    (IDX,ORI1,ORI2,TYP) BYTE,
    (I,A1,A2)(vtses) BYTE,
    L(vtses) WORD) EXTERNAL;
DECLARE OBJORD(objnr) BYTE EXTERNAL;
DECLARE (VTSIZE,PERI_SEUIL,REC_TOLER) WORD EXTERNAL;
DECLARE (XPIXNB,YPIXNB) WORD EXTERNAL;

RECORD: PROCEDURE(PNOM) BYTE EXTERNAL;
        DECLARE PNOM PTR; END RECORD;
CHRDICO: PROCEDURE(ADRS) BYTE EXTERNAL;
         DECLARE ADRS PTR;END CHRDICO;
DELOBJ: PROCEDURE(ADRS) BYTE EXTERNAL;
        DECLARE ADRS PTR; END DELOBJ;

INITSOFIA: PROCEDURE EXTERNAL;
           END INITSOFIA;
PARAM: PROCEDURE EXTERNAL;
       END PARAM;
DEFINTBL: PROCEDURE EXTERNAL;
          END DEFINTBL;

$LIST
/************************************************************************
*                                                                       *
*          Declaration External Pour Utilitaires VX200P.OBJ             *
*                                                                       *
*                   V.-01- 25.09.86                                     *
*                                                                       *
************************************************************************/

DECLARE (TDX,TDY,TFX,TFY)(64) WORD EXTERNAL;
DECLARE (AD,AF)(64) WORD EXTERNAL;
DECLARE FREEM(3000) BYTE EXTERNAL;
DECLARE (AP,XP,YP)(2) WORD EXTERNAL;
DECLARE (CONTOUR$TROUVE,FERME) BYTE EXTERNAL;
DECLARE (L,LMAX) BYTE EXTERNAL;
DECLARE AMAX WORD EXTERNAL;
DECLARE LINMIN WORD EXTERNAL;
DECLARE (NIVMINDEC,SEUIL,SEUILMIN) WORD EXTERNAL;
DECLARE APPREN BYTE EXTERNAL;

MARQUE: PROCEDURE(X,Y) EXTERNAL;
        DECLARE (X,Y) WORD; END MARQUE;

DECLARE A WORD; END TRACE;
CONTOURX: PROCEDURE(XD,XF,YL) EXTERNAL;
          DECLARE (XD,XF,YL) WORD; END CONTOURX;

IN_LS1 : PROCEDURE BYTE EXTERNAL ;
        END IN_LS1;

OUT_LS1 : PROCEDURE(B) EXTERNAL ;
        DECLARE B BYTE ;
        END OUT_LS1;

TEST_LS1 :PROCEDURE BYTE EXTERNAL ;
        END TEST_LS1 ;
```

```
PRINT_LS1 : PROCEDURE(NUM_CANAL,TYPE,PT_PAR) EXTERNAL;
    DECLARE NUM_CANAL WORD ;
    DECLARE TYPE      BYTE ;
    DECLARE PT_PAR POINTER ;
    END PRINT_LS1;

INPUT_LS1 : PROCEDURE(NUM_CANAL,TYPE,PT_PAR,PT_STATUS) EXTERNAL;
    DECLARE NUM_CANAL WORD ;
    DECLARE TYPE      BYTE ;
    DECLARE PT_PAR POINTER ;
    DECLARE PT_STATUS POINTER ;
    END INPUT_LS1;

DECLARE CANAL WORD EXTERNAL;

TA: PROCEDURE(X,Y) BYTE EXTERNAL;
    DECLARE (X,Y) WORD; END TA;
ECRI: PROCEDURE(X,Y,PIX) EXTERNAL;
    DECLARE (X,Y) WORD; DECLARE PIX BYTE; END ECRI;
CLEAR: PROCEDURE(A) WORD EXTERNAL;
    DECLARE A WORD; END CLEAR;
BARATIN: PROCEDURE(X,PY,PIX,TAILLE,PCAR) EXTERNAL;
    DECLARE X WORD;
    DECLARE (PCAR,PY) POINTER;
    DECLARE (PIX,TAILLE) BYTE; END BARATIN;

$LIST
```

What is claimed is:

1. Process for the automatic recognition of objects liable to overlap, on the basis of respective reference images of said objects, and the image of a group of objects to be recognized, said images being stored in the form of digital values representing for each image the coordinates of the points of a contour line of said image, in a frame of reference, said process consisting of coding for each image, successive elementary segments, the ends of each elementary segment being substantially located on the same contour line, so that for each segment, said coding gives the length of said segment, as well as its angle with respect to a reference direction, said coding operation being performed both during a "learning" phase of the different objects to be subsequently recognized and in a subsequent "recognition" phase of the objects liable to overlap, wherein said process comprises in the learning phase the following steps:

investigating for each reference image contour, pairs of successive or non-successive characteristic segments of said contour line, each formed from one or more elementary segments, said characteristic segments being oriented in a predetermined direction of the contour line, each pair determining a characteristic transition vector defined by parameters which include the value of an angle, oriented in the direction of the contour line, this angle being defined as the angle between the two oriented characteristic segments of the pair, the coordinates of the origin and the length of each characteristic segment of the pair, a transition vector being characteristic when its parameters provide a substantive discrimination of the contour of the corresponding object, even when said object is overlapped by one or more other objects, the parameters of the transition vectors being stored, hierarchizing the transition vectors of a contour as a function of their discrimination parameters, modifying said hierarchization of the transition vectors during the acquisition of the transition vectors of the contours of the different objects, so as to eliminate similar transition vectors for different contours, and said process comprising in the recognition phase the following steps:

performing the same transition vector determination operation in the characteristic segments of the contour of the image of the objects to be recognized, comparing in the hierarchization order, the values of the parameters of the transition vectors of the contour of the image of the objects to be recognized and the contour of the reference images of each object, so as to investigate the similarities of the values of said parameters, forming a presence hypothesis of an object corresponding to a transition vector for which the comparison has established a similarity, and effecting a fine check of said hypothesis by comparing successive elementary segments of the contour of the reference image of said object with successive elementary segments of the contour of the image of the objects to be recognized.

2. The process according to claim 1, wherein the successive elementary coded segments are obtained by Freeman coding making it possible to obtain successive segments defined by their orientations and having ends which are located on the contour line of each image, said Freeman coding being followed by a corrective processing making it possible to deduce on the basis of each Freeman-coded segment, one or more successive elementary segments, the ends of each located on the contour line of the image, said successive elementary segments being isotropic and of the same length.

3. The process according to claim 2, wherein the corrective processing consists, for each Freeman-coded segment, of differentiating said segment with respect to its order number in the contour, in order to compensate for orientation irregularities, performing a conversion of the values resulting from the differentiation of each segment in order to compensate for length irregularities, filtering the signal resulting from said conversion, sampling said signal at a constant frequency and then integrating the sampled signal, said integration producing said successive elementary coded segments, the preceding corrective processing also making it possible to extract the angular points, and consequently the characteristic segments.

* * * * *